United States Patent
Reddy et al.

(10) Patent No.: US 9,513,638 B2
(45) Date of Patent: Dec. 6, 2016

(54) AUTOMATIC POOL AND SPA WATER LEVELER ON A NON-STATIC LINE

(71) Applicants: Rakesh Reddy, Deerfield Beach, FL (US); Bruce Johnson, Deerfield Beach, FL (US); Kevin Doyle, Deerfield Beach, FL (US)

(72) Inventors: Rakesh Reddy, Deerfield Beach, FL (US); Bruce Johnson, Deerfield Beach, FL (US); Kevin Doyle, Deerfield Beach, FL (US)

(73) Assignee: Flashpoint Technologies, LLC, Deerfield Beach, FL (US)

( * ) Notice: Subject to any disclaimer, the term of this patent is extended or adjusted under 35 U.S.C. 154(b) by 308 days.

(21) Appl. No.: 14/178,332

(22) Filed: Feb. 12, 2014

(65) Prior Publication Data

US 2015/0227145 A1    Aug. 13, 2015

Related U.S. Application Data

(60) Provisional application No. 61/902,152, filed on Nov. 8, 2013.

(51) Int. Cl.
*E04H 4/00* (2006.01)
*G05D 9/12* (2006.01)
(Continued)

(52) U.S. Cl.
CPC ............... *G05D 9/12* (2013.01); *B05B 17/08* (2013.01); *G01F 23/00* (2013.01); *E04H 4/14* (2013.01); *Y10T 137/7303* (2015.04)

(58) Field of Classification Search
CPC ...................................................... E04H 4/12
(Continued)

(56) References Cited

U.S. PATENT DOCUMENTS 3,895,402 A    7/1975    Page
5,154,205 A   10/1992   Langill
(Continued)

FOREIGN PATENT DOCUMENTS

JP    03007849    1/1991
JP    08303862   11/1996
JP    10246508    9/1998

OTHER PUBLICATIONS

"SAVIO Automated Water Level Sensor: Operating Manual & Specifications", SD129113, 2003, 1-8.
(Continued)

*Primary Examiner* — Lori Baker
(74) *Attorney, Agent, or Firm* — Tangent Law Group, PLLC; Eric J. Weierstall, Esq.

(57) ABSTRACT

A water level detection system in a pool, spa, fountain or water feature forming a body of water within, the water level detection system is provided with a tap line coupled to a plumbing line on a suction or supply side of a filtration system and admitting water from the pool, spa, fountain or water feature such that the change in level of the water in the tap line corresponds to a change in level of the water in the pool, spa, fountain or water feature. A sensing module is mounted to the tap line and has at least one sensor for detecting the height of a column of water or the pressure of a column of air in the water tap line. A controller is coupled to the sensing module and adapted to collect the data from the sensors that detect changes in the level of the water level of the body of water, communicate the detection of such a change, and report such a change to initiate addition or removal of water from the body of water to adjust the water level in the body of water to a set point.

45 Claims, 13 Drawing Sheets

(51) Int. Cl.
    *B05B 17/08*     (2006.01)
    *G01F 23/00*     (2006.01)
    *E04H 4/14*     (2006.01)

(58) Field of Classification Search
    USPC ............................................ 4/508, 488–513
    See application file for complete search history.

(56) References Cited

U.S. PATENT DOCUMENTS

| | | |
|---|---|---|
| 5,596,773 A | 1/1997 | Cueman |
| 5,730,861 A | 3/1998 | Sterghos |
| 6,481,246 B1 | 11/2002 | Johnson |
| 6,747,367 B2 | 6/2004 | Cline |
| 6,826,956 B1 | 12/2004 | Matthews |
| 7,194,909 B2 | 3/2007 | Kang |
| 7,272,960 B2 | 9/2007 | No |
| 7,859,813 B2 | 12/2010 | Cline |
| 8,266,737 B1 | 9/2012 | Goettl |
| 2003/0106582 A1 | 6/2003 | Jeong |
| 2009/0165202 A1 | 7/2009 | Morrison |
| 2010/0139011 A1 | 6/2010 | Kim |
| 2010/0310382 A1 | 12/2010 | Kidd et al. |
| 2011/0307221 A1 | 12/2011 | Higgins et al. |
| 2012/0125369 A1 | 5/2012 | Pers et al. |
| 2013/0105182 A1 | 5/2013 | McLoughlin |

OTHER PUBLICATIONS

"Surface Water-Level Sensor Selection Guide", Hatch Environmental: OTT/Hydrolab Sensor Selection Guides, 2008, 1-4.

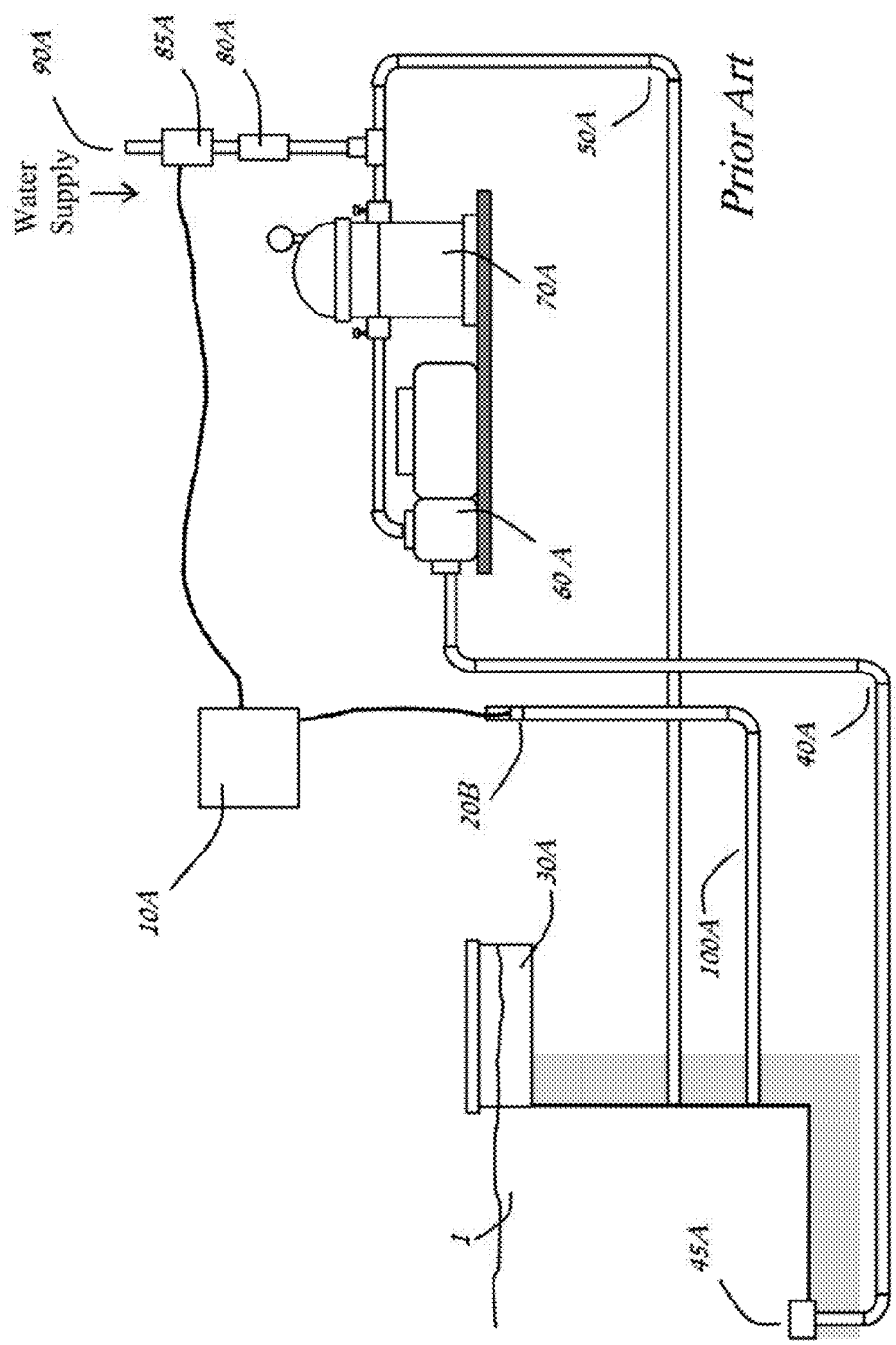
FIGURE 1B — Prior Art

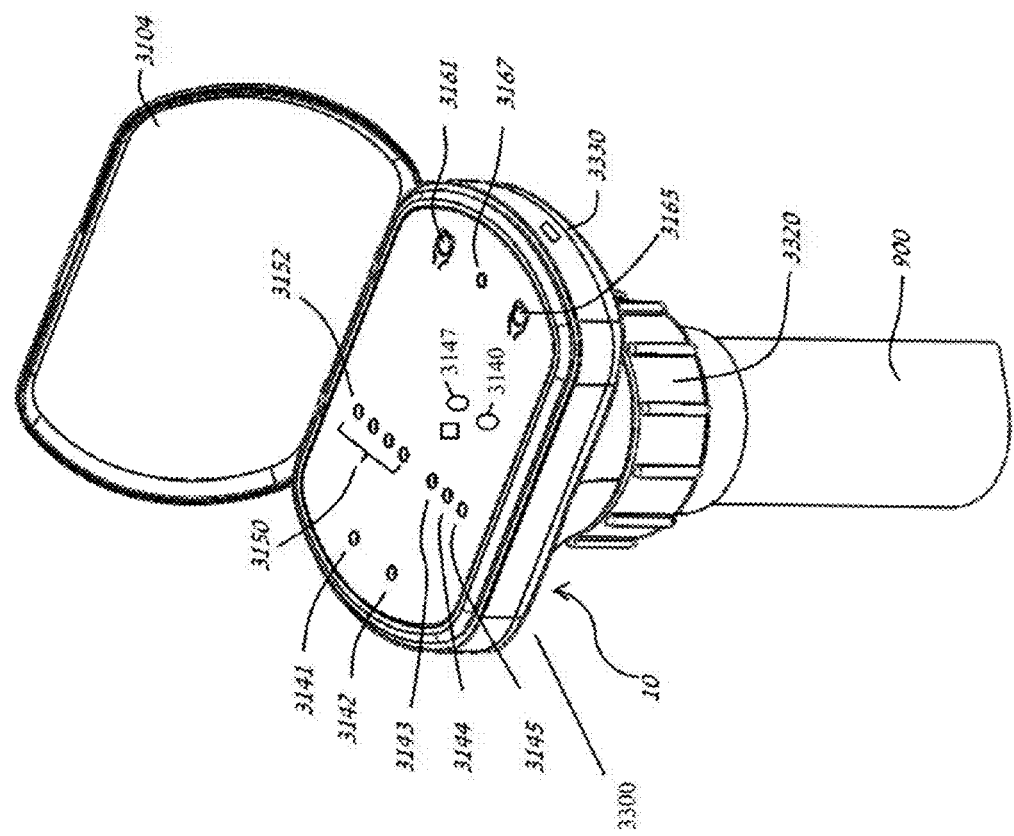

AUTOMATIC POOL AND SPA WATER LEVELER ON A NON-STATIC LINE

CROSS-REFERENCE TO RELATED APPLICATIONS

This application claims the priority of U.S. provisional patent application 61/902,152, filed Nov. 8, 2013, which is incorporated herein by reference.

BACKGROUND OF THE INVENTION

Water levels in pools, spas, fountains, and similar water features vary based on evaporation, splash out, rain, leaks in the structure and other causes. There is a need for products in a pool and spa environment to keep the water in various bodies of water at a constant level. Thus, it is necessary to monitor and refill these bodies with more water. To accomplish this a water leveling device is typically used, these water leveling devices or water levelers have various aspects and components to facilitate sensing and accommodating adjustments in water level.

There are a number of types of water levelers on the market today for a variety of water level detection and maintenance applications. Some use a float style device that regulates the level based on a valve connected to the float or to sensors which in turn adjust the level from a catchment or other container. This is similar to systems used to regulate water in tanks, toilets etc. Other types use physical sensors in communication with the pool, spa, fountain or water feature and vary in sensor type to include conductivity sensors, pressure sensors and a variety of other electronic controls all designed to monitor water levels.

Some examples of a float style device that regulates the level based on a valve connected to a float include for example U.S. Pat. No. 5,154,205 to Langill, U.S. Pat. No. 6,481,246 to Johnson et al, and U.S. Pat. No. 8,266,737 to Goettl. Further examples using conductivity, ultrasonic, pressure and other sensors include U.S. Pat. No. 5,596,773 to Cueman, U.S. Pat. No. 5,730,861 to Sterghos et al., and U.S. Pat. No. 7,859,813 to Cline et al.

Typically, as noted, water level devices in pools, spas, fountains, or similar water features utilize sensors that require a separate static line attached to the body of water that allows the sensor to sense the water level outside the pool or spa. Alternatively, some systems are actually installed in the body of water, for instance in a skimmer area. Problems occur with static line systems due to the additional cost of the line, costs associated with coupling the monitor on the line the distance to the filtration system controller, and potential leaks and fouling in the additional line. In the case of those systems that are installed in the body of water, electrical hazards, user interruptions due to proximity to swimmers and potential tampering with sensors, and fouling due to water borne debris cause inaccuracies and failures in these systems.

Thus, there exists a need for a water level detection and adjustment device that not only assures proper operation of the pool, spa, fountain or similar water feature, but also protects the circulating equipment and reduces the chance of accidental overfilling and wasting of water. Such a system would be based on both a new and unique plumbing concept as well as a sophisticated multi sensor system that assures consistent and accurate water level sensing with a minimal amount of material cost, installation cost, and which can be retrofitted to fit and be powered by existing pools, spas, fountains and water feature currently on the market.

Further, the inability of existing water leveling devices and systems to update and analyze performance parameters for further functionality in detecting abnormal filling of the bodies of water and determining and tracking filling rates as well as safely shutting down during pump operations leaves a need for an additional feature rich water leveler that has such characteristics. Such a system would be capable of protecting the circulating equipment, reducing the likelihood of accidental overfilling and wasting of water, and potentially be able to aid in detecting leaks or other fault conditions in the pool. It would also be retrofittable to existing pool pad equipment without the need for additional underground lines.

BRIEF DESCRIPTION OF THE INVENTION

Aspects of the invention include providing a water leveler device and system that assures proper operation of the pool, spa, fountain or similar water feature, and protects the circulating equipment and reduces the chance of accidental overfilling and wasting of water by coupling to a non-static or selectively circulated tap line.

An aspect of the invention is to provide a water leveler system based on sensing on a tap line extending from existing plumbing with a multi sensor system that assures consistent and accurate water level sensing with a minimal amount of material cost, installation cost, and which can be retrofitted to any pool or spa currently on the market.

A further aspect of the invention is to provide a unique method of installing and operating a water level detection system in a pool, spa, fountain or similar water feature on a pipe near the pump either on the suction or return flow sides of a water circulation system.

Yet another aspect of the invention is to provide a system capable of detecting the activity of the circulating pump and safely secure and prevent the add water function of the system during the periods the pump is operational or only allowing the add water function when the pump is non-operational.

A still further aspect of the invention is to provide a water level detection system that can be coupled to a pressurized portion or vacuum portion of the pluming loop.

Another aspect of the invention is to provide a sensor module that can be set to operate in a selectively-pressurized tap line from a plumbing line in a water filtration system in a pool, spa, fountain or similar water feature.

Yet another aspect of the invention is to provide a multi-sensor module that includes a pressurized air column therein with a controller with software adapting the controller for analyzing and compensating for additional variables, including for instance but not limited to temperature, when making the pressure and water column height measurements on the pressurized column of air, keeping in mind that this may be a positive or negative pressure being exerted.

Yet another aspect of the invention is to provide a multi-sensor module that includes a pressurized air column therein with a controller, an equalizing valve coupled to the controller and automatically controlled by the controller to cycle a vent for pressure compensation and with software adapting the controller for analyzing and compensating for additional variables, including for instance but not limited to temperature, when making the pressure and water column height measurements on the pressurized column of air.

Another aspect of the invention is a user interface for communicating the water level and any variables associated with adjusting the water level, either through a pre-purposed user interface element or as a program on a mobile device or similar user interface.

A still further aspect of the invention is to provide for a water level detection system plumbed on a non-static tap line that includes an industry standard three prong power coupling allowing for retrofitability and/or plug and play interfacing with existing systems.

Yet another aspect of the invention is to provide a water level detection system that can measure real time fill rates as data and communicate same to a controller to manage the data, store the data, compare the data against previous data, communicate the data to other sub-systems, make additional calculations to compensate for other variables for the body of water effected by the change in water added to the pool, for example but certainly not limited to pH, temperature, and other variables, and display the data in a user interface.

Another aspect of the invention provides a water level detection system with an operations check routine, whereby the data from the at least one sensor and the filtration system is used to verify each other in certain operation modes and if the verification results in data that does not synchronize properly to indicate a service error.

A further aspect of the invention is to provide a system with the ability to monitor in real time the fill rate of a negative edge pool, spa, fountain, or water feature and, based on monitoring real time fill rates, check for runaway fill conditions whereby an error has caused the pool to continuously fill and drain simultaneously while still providing protection against run dry conditions in a trough drain in the negative edge pool.

A still further aspect of the invention is to provide a retrofitable power circuit to power the system and related components from a standard multi-pin connector typically used to power actuated switches in the pool industry.

The water level detection system of the instant invention includes an apparatus, a method of operating the apparatus, and a system containing the apparatus.

The apparatus of the instant invention includes a water level detection system in a pool, spa, fountain or water feature forming a body of water within, said body of water being at a specified water level, the water level detection system having a tap line coupled to a plumbing line on a suction or supply side of a filtration system and admitting water from the pool, spa, fountain or water feature such that the change in level of the water in the tap line corresponds to a change in level of the water in the pool, spa, fountain or water feature. A sensing module, the sensing module mounted to the plumping tap line and having at least one sensor for detecting the height of a column of water or the pressure of a column of air in the water tap line. A controller coupled to the sensing module such that controller is enabled to collect the data from the sensors that detect changes in the level of the water level of the body of water, communicate the detection of such a change, and report such a change to initiate addition or removal of water from the body of water to adjust the water level in the body of water to a set point.

The controller can prior to initiating adding or removing water from the body of water confirm non-operation of a pump in the filtration system. The controller can further lock out operation of the pump in the filtration system during the adding or removing of water from the body of water. The controller of the water level detection system can be further coupled to a pump controller. A pump controller can also sense the water level detection system status and communicates when the pump system is active. The sensing module can be contained in a housing connected to the tap line. The sensing module can be remote from the controller. The tap pipe can be a pressurized tap pipe. The pressurized tap pipe can be a selectively-pressurized tap pipe.

The system can further comprise an automated pressure valve coupled to the controller and operating to allow air in an interior of the housing to selectively pressurize or depressurize to ambient air. The sensor module can include at least one of an at least one temperature sensor, an at least one pressure sensor and an at least one water column height sensor. The at least one column height sensor can be at least one of an at least one ultrasonic sensor, capacitive sensors, radar sensors, and time of flight sensors. The at least one pressure sensor can be at least one of an at least one an absolute pressure sensor, a gauge pressure sensor, a vacuum pressure sensor, a differential pressure sensor, a piezoresistive strain gauges, a capacitive sensor, an electromagnetic sensor, a piezoelectric sensor, an optical sensor, and potentiometric sensor.

The water level system can further comprise a controlled valve controlling a water supply line coupled to the pipe line and the water level controller. The controller can communicate with the controlled valve to control admission of water from the water supply line in a fill operation. The controller can utilize a pressure differential sensed in the tap pipe to determine whether the fill operation has reached an absolute level. The controller can be further adapted to provide a pressure offset of a target pressure during the fill operation to account for instantaneous pressure spikes that appear during the fill operation. The controller can utilize direct measurement of the height of a column of water in the tap line to determine whether the fill operation has reached an absolute level.

The controller can further monitor the instantaneous change in the pressure to measure and compensate for instantaneous pressure changes due to changing demands on the water supply line during the fill operation. The controller can be adapted to monitor real time fill rates. The controller can stop a filling operation if the controller senses increases in height of the water level in the pool which is not detected to be proportional to the monitored real time fill rate at a particular point. The controller can be further adapted to provide a dynamic adjustment of the target point using an adjustment increment to adjust the set point to an incremented target point for the fill cycle.

The controller can communicate with the controlled valve to control removal of water from the water supply line in a negative fill operation. The controller can sense through a sensor a pressure differential in the tap pipe to determine whether the negative fill operation has reached an absolute level. The controller can be further adapted to provide a pressure offset of a target pressure during the fill operation to account for instantaneous pressure spikes that appear during the negative fill operation. The controller can utilize direct measurement of the height of a column of water in the tap line to determine whether the negative fill operation has reached an absolute level for a target point. The controller can be further adapted to provide a dynamic adjustment of the target point using an adjustment increment to adjust the target point to an incremented target point for the negative fill cycle.

The controller can be further coupled to and communicates with at least one additional pool, spa, fountain or water feature treatment system. The at least one treatment system can be at least one of an at least one purification system, pH balancing system, softener system, chlorination system, heating system, filtration system, pumping system, wherein the controller communicates data from the water level detection system to the at least one the treatment system. The data communicated to or from the water level detection system includes data regarding at least one of temperature of the water, salinity of the water, pH of the water, rate of evaporation of the water, rate of loss of the water, rate of fill of the water, pressure in the water level detection system, humidity, detecting pump speeds, pump status, amount of water added, dilution rates, salinity, and abnormal fill conditions.

The data from the water level detection system can be stored as historical data. The controller can utilizes the historical data for comparison to an at least one real time measurements to detect errors and maintain the water level detection system operation within a set of safety limits. The controller sends an alert to a graphical user interface for display on the interface if the real time measurement is outside the pre-determined limits of the historical data.

The controller of the water detection system can further comprise a control routine using the at least one sensor to detect the height or pressure change of the pump operation or having the operation signaled to the controller and measuring the height of the column of water and allowing it to decrease or increase to flush the water in the tap line. The controller of the water detection system can further comprise a control routine to detect entrapped air in the plumbing line or tap line. The control routine to detect entrapped air can further trigger a safety shutoff in the pump directly or via a control panel.

The controller of the water detection system can further comprise and execute an operations check routine. The operations check routine can further include adapting the controller to and performing the method steps of receiving information from an at least one height sensor detecting the height of a water column in the water tap and receiving information from an at least one pressure sensor sensing pressure in the air column above the water column, verifying the data from said at least one height sensor when the controller has received data indicating the pump is running and reporting if the information received from the at least one height sensor and the at least one pressure sensor agree with one another and the status of the pump. The reporting can further comprise activating at least one indicator element on a user interface.

The user interface further can comprise an override switch, the override switch being engaged and disabling a controlled valve controlling a supply of water to the pool, spa, fountain or water feature. The override switch can be engaged as part of a fault identification routine to detect at least one of shorts or open circuits in the water detection system, faulty sensors, and vent systems. The controller can detect the amount of water filling the pool and further calculates values for at least one of an amount of salt dilution due to an added amount of water, an amount of chlorine to be added due to added water, and an amount of pH balancer to be added due to the addition of water and displays same to a user or communicates same to a controller of a further system in the pool filtration system.

The controller can be located remotely from the sensing module. The controller can be located in a housing with the sensing module. The water level detection system can be a negative edge in said pool pouring water to a filtration trough, whereby the filtration trough has a trough level sensing sub-system coupled to the pool level detection system and the trough level sensing sub-system ensure water flows from the pool to the trough. The water level detection system can further comprise an electric coupling having at least two active power inputs coupled to an at least two switched relays coupled to at least two drivers and controlled by a microcontroller, the electric coupling switching the power input through instructions from the micro controller switching in or out the power inputs.

That apparatus of the invention further includes a water level sensor housing/package in a pool, spa, fountain or water feature containing a body of water within, said body of water being at a specified water level, the water level detection sensor housing/package having an at least one sensing module, the sensing module having at least one sensor for detecting the height of a column of water and the pressure of a volume of air enclosed within the housing, the housing being in communication with the body of water such that changes in the height of the water or the pressure of the air in the housing are proportional to the change of level in the body of water; and a controller coupled to the sensing module such that controller is enabled to collect the data from the sensors that detect changes in the distance of the column of water and the pressure in the housing that are proportional to the level of the changes in the level of water in the body of water and coupled to and communicating the detection of such a change and reporting such a change to indicate a water level and to initiate addition or removal of water from the body of water to adjust the water level in the body of water.

The water level sensor housing/package can further comprise a controlled valve coupled to a water supply line, the controller controlling the controlled valve to open to admit water into the body of water and adjust the level of water. The water level sensor housing/package can further comprise a controlled valve coupled to a drain, the controller controlling the controlled valve to open or shut the drain. The water level sensor housing/package can be coupled to a pipe. The pipe can be unpressurized. The pipe can be selectively pressurized.

The water level sensor housing/package can further comprise at least one sensor sensing at least one of temperature, ambient humidity, salinity, fill rate, dilution rate, ambient temperature outside the system. The controller can further communicate with one or more water filtration system sub-systems. The at least one sub-system can be at least one of an at least one purification system, pH balancing system, softener system, chlorination system, heating system, filtration system, and pumping system.

The controller can communicate data from the water level detection system to at least one the treatment system. The controller can detect the amount of water filling the pool and further calculates values for at least one of an amount of salt dilution due to an added amount of water, an amount of chlorine to be added due to added water, and an amount of pH balancer to be added due to the addition of water and displays same to a user or communicates same to a controller of the further sub-system in the pool filtration system.

The water level sensor housing/package can further comprise a user interface. The sensor housing/package controller can be coupled to the user interface through a wired or wireless connection and communicates with the user interface the condition of the water level in the a pool, spa, fountain or water feature. The user interface can be remote from the sensor housing/package.

The system of the invention includes a water level sensor system in a pool, spa, fountain or water feature containing a body of water within, said body of water being at a specified water level, the water level detection sensor system having an at least one sensing module, the sensing module having at least one sensor for detecting the height of a column of water or the pressure of a volume of air enclosed within the housing or both the height of a column of water and the pressure of a volume of air enclosed within the housing, the housing being in communication with the body of water such that changes in the height of the water or the pressure of the air in the housing are proportional to the change of level in the body of water; a controller coupled to the sensing module such that controller is configured to collect the data from the sensors that detect changes in the distance of the column of water and the pressure in the housing that are proportional to the level of the changes in the level of water in the body of water and coupled to and communicating the detection of such a change and reporting such a change to indicate a water level and to initiate addition or removal of water from the body of water to adjust the water level in the body of water; and a controlled valve coupled to a water supply line, the controller controlling the controlled valve to open to admit or remove water into or from the body of water and adjust the level of water upon a signal from the controller to a specified level, wherein the controller of the water detection system is further configured to perform an operations check routine comprising receiving information from an at least one height sensor detecting the height of a water column or receiving information from an at least one pressure sensor sensing pressure in the air column above the water column, verifying the data from said at least one height sensor or said at least one pressure sensor when the controller has received data indicating a pump in communication with the pool is running and reporting if the information received from the at least one height sensor or the at least one pressure sensor or both the at least one height sensor and the at least one pressure sensor agree with the communicated status of the pump.

The reporting can further comprise activating an at least one indicator element on a user interface. The user interface can further comprise an override switch, the override switch being engaged and disabling the controlled valve controlling the supply or drain of water to the pool, spa, fountain or water feature. The override switch can be engaged as part of a fault identification routine to detect at least one of shorts or open circuits in the water detection system, faulty sensors, and vent systems. The controller can be further configured to engage the pump override and override any call to open the supply valve if the data indicating the pump is running does not correlate to the readings from the at least one pressure sensor, the at least one height sensor or both the at least one pressure and at least one height sensor.

The apparatus of the invention further includes a power circuit powering an actuated switch in a pool, spa, fountain, or water feature, comprising an at least two pin connector coupled to a power source and providing power to a first of an at least two pins and a second of an at least two pins; a microcontroller coupled to and communicating with the at least two pin connector; a first branch of an at least two branches of the power circuit having a first of an at least two switched relays and coupled to the first of the at least two pins and a first driver, driving the actuated switch and a water leveler system; and a second branch of an at least two branches of the power circuit coupled to and powering a second switch of an at least two switched relays, driving the actuated switch and a water leveler system, wherein the microcontroller detects which of the pins is actively being powered and closes the respective first or second of the at least two relays so as to permit power to flow down the branch and power the actuated switch and the water level system.

The methods of the invention include the methods of operating the apparatuses as described herein.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations that would be apparent to those skilled in the art.

BRIEF DESCRIPTION OF THE DRAWINGS

FIG. 1B shows a schematic of a prior art configuration sensing water level using a static line in communication with the pool, spa, fountain or water feature.

FIGS. 9A and 9B show an isometric view and a cross-sectional view of a further exemplary embodiment of the sensor module, housing and user interface of the instant invention.

DETAILED DESCRIPTION OF THE DRAWINGS

The instant invention has various exemplary embodiments based on both a novel plumbing scheme as well as a sophisticated sensor system that assures consistent and accurate water level sensing with a minimal amount of material cost, installation cost and which can be retrofitted to most pools or spas currently on the market. As indicated, components within each of the exemplary embodiments can be utilized with other exemplary embodiments and the examples of plumbed line configurations, communications, coupling and the like are non-limiting examples.

The principle behind the functionality of the device is that the water level in the body of water being tested dictates the pressure in the plumbing members of the system. The invention exploits this at the active lines in a pool, both suction and return or either suction or return, by differentiating between when the plumbing is in an active state, e.g. pump is running, and when plumbing is static, e.g. pump is inactive, and any changes in pressure at the sensors during non-operation is proportional to changes in the static water level condition of the pool. Of course this varies when the system becomes pressurized from, for example, the operation of the pump during filtration. This change can however be tracked and use made of the measurements in further embodiments of the instant invention and its controls. This can also include systems whereby pressure equalization is facilitated, at times, but allowing for a period of time whereby the pressure changes are likewise proportional to level changes in the pool and having the ability to sense the differences at these times for determining level measurements appropriately.

Figure 1A:
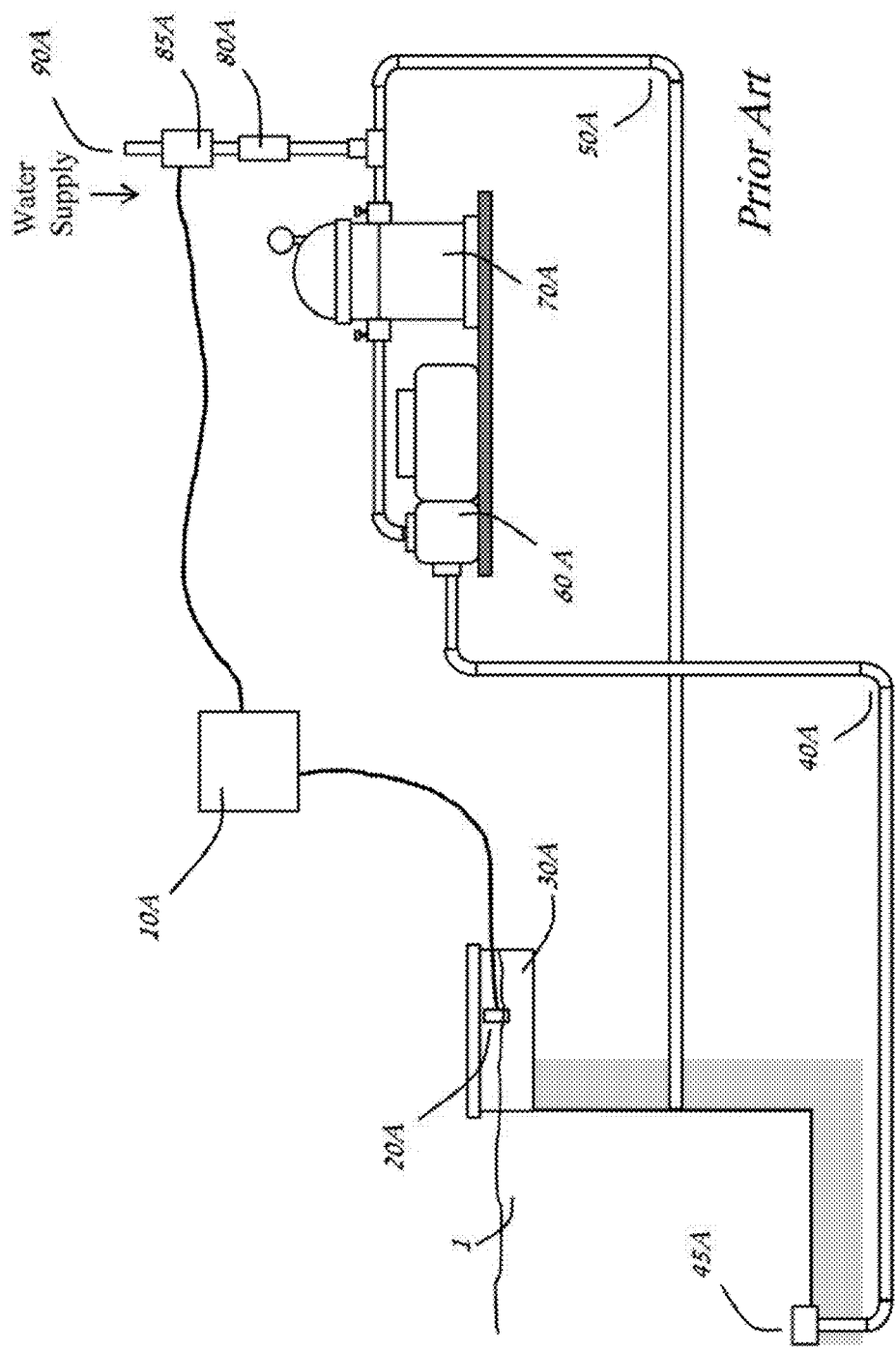
FIG. 1A shows a schematic of a prior art configuration sensing water level at or near the surface of the pool, spa, fountain or water feature.

FIGS. 1A and 1B show schematic drawings of prior art water level detecting devices. Referring to FIG. 1A, a water level control box 10A is coupled to a water level sensor 20A in a pool, spa, fountain, water feature or similar body of water 1. Reference is made throughout herein to a pool and should be read to incorporate a pool, spa, fountain, and/or similar water features alone or in conjunction with further such similar water features. These water features are typically, but not necessarily, man-made. In the case of swimming pools and spas, the sensor 20A is often at the skimmer, shown here as 30A, or adhered to a wall (not shown). The pool, spa, or water feature also encompasses common elements in water filtration for such bodies of water. These include a main drain 45A, a main suction line 40A coupled to a pump 60A which draws water flow in from the body of water in pool 1 for filtration and treatment. A filter 70A is shown coupled to the pump 60A. This filters and, typically, treats the water and returns the water along main return line 50A.

To supplement water levels in the body of water, a further pipe provides water from a water source 90A, for instance a typical residential water service. A solenoid 85A is used to switch a valve coupled to the solenoid 85A to admit water into the system. Check valve 80A prevents backflow. It should also be noted that in addition to filling pools, the water level system and device can remove or drain water from a pool to maintain its level. Again, such a system is typical and known in the prior art. The location of the sensor 20A at the surface of the pool to be monitored leads to a potential for fouling as it is located at the skimmer 30A in the embodiment of FIG. 1A. Further, the level varies when the pool is in use and the degree to which such use interrupts the sensor readings is difficult in that it would be hard to differentiate such use during measurements. Finally, such sensors are more open to abuse and fouling by occupants contacting or otherwise disturbing the sensors through physical contact. In addition, such systems incur a high cost in installation because of the long electrical connection and conduit required to contain the electrical interface to the sensor which also renders the leads susceptible to failure and physical insult.

As seen in FIG. 1B, other types of prior art installations provide a static plumbing line 100A brings the water level closer to the pool pump equipment. The system principally has all the same components as the prior art device shown in FIG. 1A. However, the sensor system of FIG. 1A is situated in the skimmer 30A and the sensor 20B of the system of FIG. 1B is not so located. Instead, a static line 100A is provided with the sensor 20B therein, the static line 100A having still water within it. As such, it is an underground pipe full of isolated water without any movement or cleaning. It is in communication with the further sensor 20B.

The static plumbing line 100A with the sensor arrangement 20B is safe from interference by swimmers and fouling from surface debris and such, problems which plague the leveler of FIG. 1A. However, the static plumbing line 100A is susceptible to fouling from algae growth and other flora that propagate in still water. Although the system is simplified in that the level of water in the static pipe 100A is directly related to the level of the water in the pool, the static line 100A being typically vented to atmosphere. But the fouling from the flora that will eventually effect the static pipe 100A and will clog the line and render it incapable of performing its function without service.

Furthermore, the additional line 100A, though closer to the pad, is separate and apart from the pad plumbing, resulting in additional costs for the line as well as residual additional costs in extending the sensor leads and power to the sensors. Thus, this approach increases the cost while simultaneously increasing the points at which water leakage can occur and incurring additional costs by adding the additional lines. With the instant invention, as described below in relation to FIG. 2-9B, all of the installations can be at the equipment location, eliminating significant additional plumbing requirements, conduit installation, and labor. In addition, the instant invention resolves the issues with fouling found in the prior art.

Figure 2:
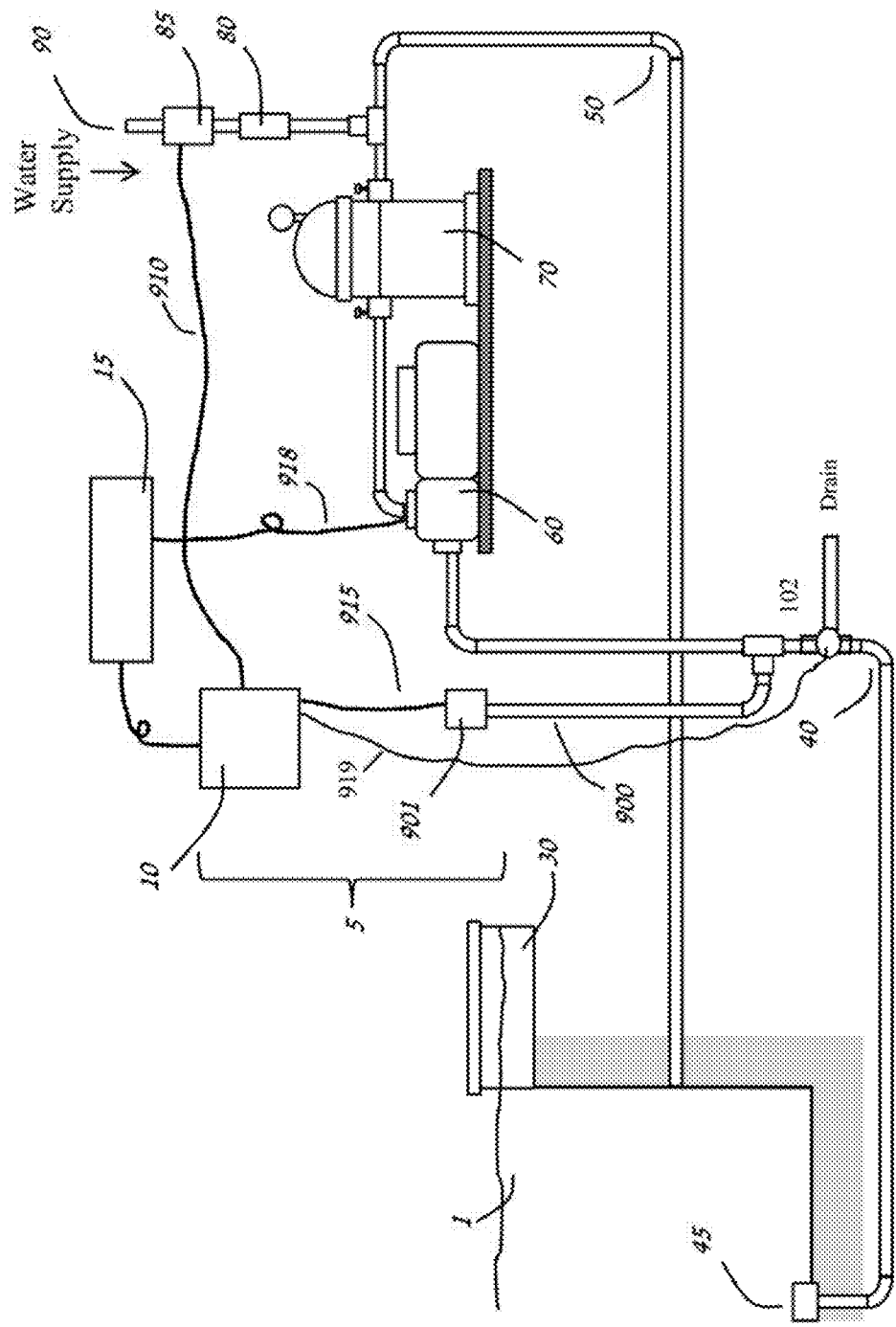
FIG. 2 shows a schematic view of an exemplary embodiment of the instant invention sensing water level from a tap line coupled to an active pipe in the filtration system.
Figure 4:
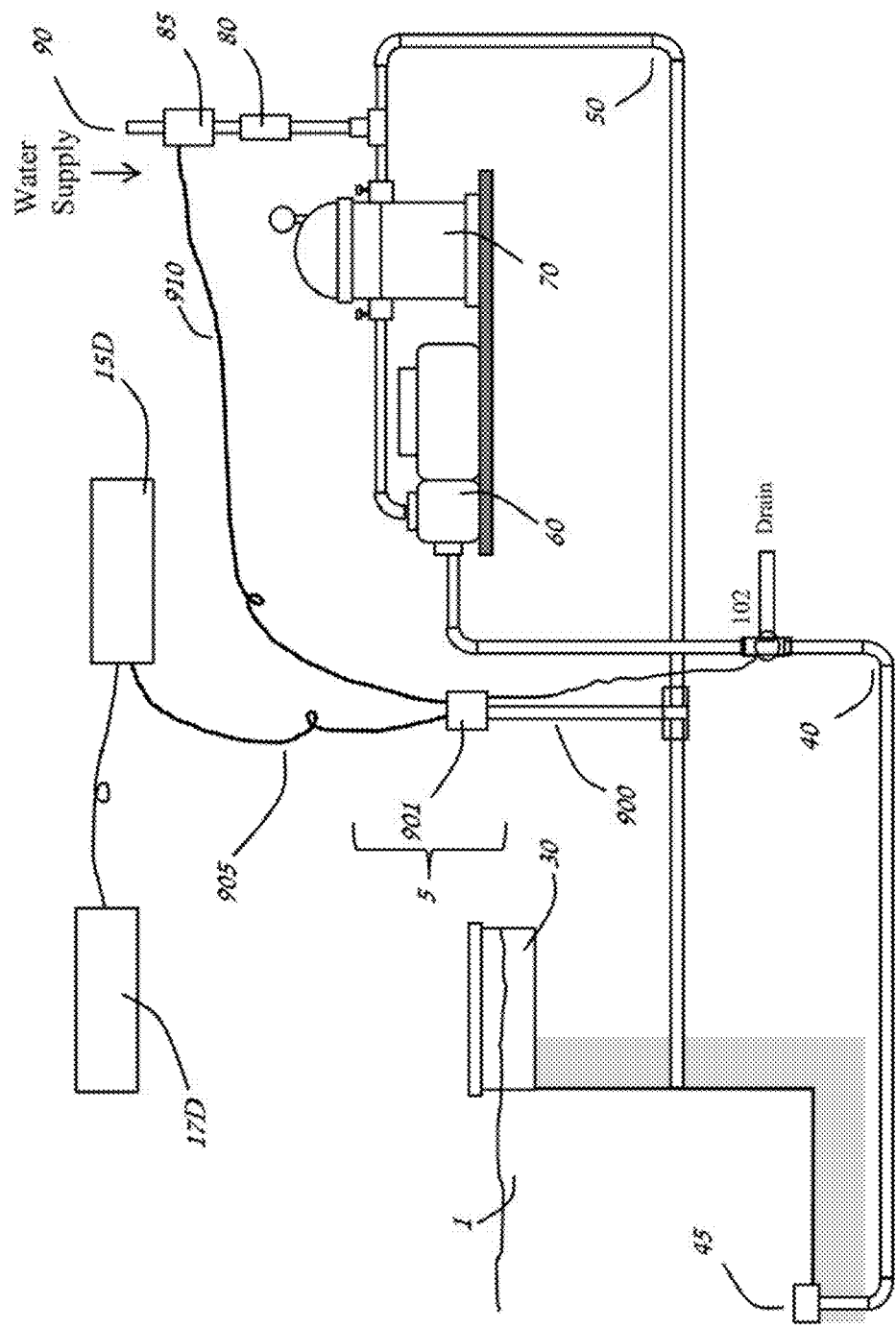
FIG. 4 shows a schematic view of an exemplary embodiment of the instant invention sensing water level from a tap line coupled to a return line in the filtration system that draws power from and communicates with existing pool control equipment.
Figure 6:
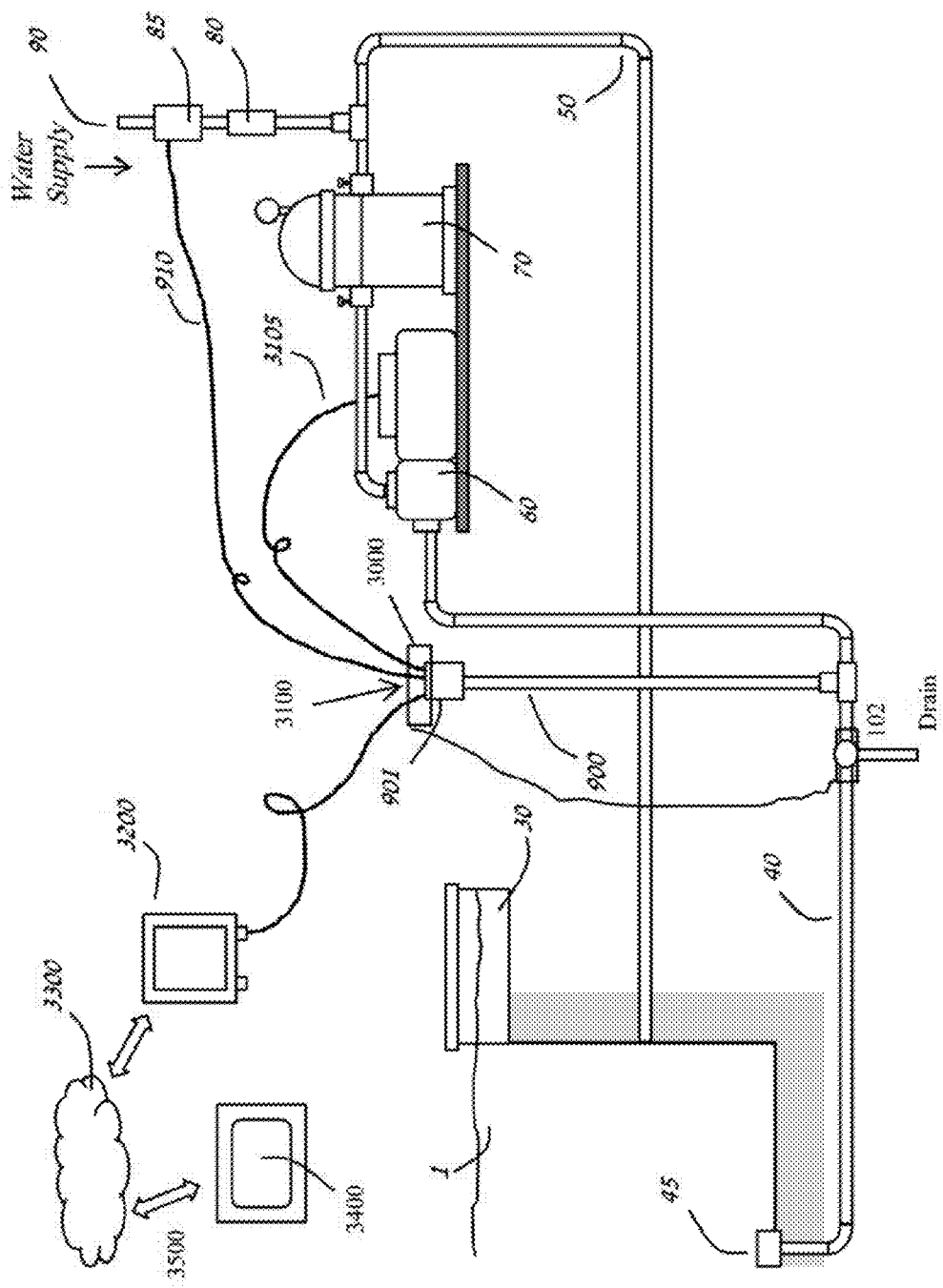
FIG. 6 shows a schematic view of an exemplary embodiment of the instant invention sensing water level from a tap line coupled to an active pipe in the filtration system.

FIG. 2 shows a schematic view of an exemplary embodiment of the instant invention sensing water level from a tap line coupled to an active pipe in the filtration system. At least one pool, spa, fountain, or water feature, in this case a pool 1, is shown with a skimmer 30, a drain 45 which is coupled to an at least one suction line 40 which is coupled to a filtration system on a pad as depicted. Reference is made to singular components for instance a sensor, a pump, etc., however, nothing precludes the use of multiples of such components and same is considered disclosed herein throughout unless otherwise specifically indicated as functioning only with a specified number of such components. On the pad a pump 60 is provided that is coupled to the at least one suction line 40 drawing water from the pool through the drain 45 and pumps the water into filter 70. A skimmer 30 is also shown. A water input or source pipe 90 is provided with a controlled valve 85 controlling the release of additional water into the piping system. A check valve 80 is also provided prior to coupling of the source pipe 90 to the filtration system. The controlled valve 85 is coupled to a water level controller 10 for controlling the controlled valve 85 which controls input of additional water to the system. Additionally to facilitate draining of the system a switched or controlled valve 102 is provided which "daylights" to an output for water from the pool 1. The valve is electronically coupled to, as represented by the communications line 919, controlled by water level controller 10 and drains water out of the system. Similar communications lines are shown as 915 and 918. Furthermore, though wired connections are show, wireless connections can also be used in coupling the controller, the sensor module and other electronic components in the system, as seen in FIGS. 1, 4, and 6. A return line 50 is provided to return the filtered water back to the pool 1.

On either the suction side or return side of the pump 60, a tap pipe line 900 is installed extending from the main plumbing lines. The tap line 900 is not necessarily buried, though it could be, but is coupled to an active pipe with water moving therein, either coupled to the suction line 40 or the return line 50. The length of the pipe can be varied. In exemplary embodiments shown, it extends above the level of the pool or spa body of water to allow for easier maintenance. If this is not possible, the system can have an isolation valve (not shown) installed to allow for future service. The tap pipe line 900 is in direct contact with water coming either from the pool 1 or going to the pool 1, rendering it non-static with water moving therein. A sensor module 901, for instance one like that of the exemplary embodiment of a sensor module shown in FIG. 3, having at least one sensor for sensing changes in the water level is then installed on the tap pipe line 900. Once properly installed, the entire system can operate, in one exemplary embodiment, as air tight thereby eliminate any possible air leaks or water leaks in the system. This is unique for water level detection systems in this environment. It provides for extremely accurate readings and allows for compensation for various environmental changes, e.g. temperature of the system, etc. as further described herein.

The sensor module 901 is coupled to the water level control 10 in the exemplary embodiment shown, which in turn interprets the output from the sensor module 901. The water level controller 10 also communicates the relevant states of the system back to the sensor module 901. In this way the water filtration system controller 15 in conjunction with the water level detection system 5 senses or alternatively can be sent data on the pump status to identify when water is actively being moved in the system via the pump 60. This can be done in a variety of ways including timers, flow sensors, and the like. In exemplary embodiments indicated in FIG. 2 the water level controller 10 is coupled 915 to the level sensor module 901. The pump 60 is coupled 918 to a water filtration or circulation controller 15 so as to directly communicate to the water level controller when the pump 60 is on and which then allows the tap line 900 to be secured as well as for the sensor module 901 to account for drops in water level accordingly as the level will be changed as the filtration system via pump 60 moves water within it as indicated by the water circulation controller 15. In further exemplary embodiments shown below in FIGS. 7-8, the water level controller can be in direct communication with a smart filtration pump so as to receive the information regarding its operation directly.

The movement of water within the system when the pump 60 is operational would result in false readings if the sensor module 901 were to measure at those times. In addition to being in direct communication with the controllers as outlined herein, it should also be understood that the sensor module 901 can measure and identify sudden drops in the height of the water column or pressure in the tap line using fuzzy logic or other data storage and training methods to learn the operation of the pump and thereby interpret the condition of the pump. This information can be shared with the water level controller 10, retained by the sensor controller shown in FIG. 3, stored in memory like that shown in FIG. 9B, or reported out and stored, as described further herein below, for further use in controlling the water level detection system 5 and other subsystems servicing the pool.

The pump 60 pressurizes the filtration system, thus momentarily increasing the pressure in the tap line 900 as well as in the other pipes in the system. Thus the operational status of the pump 60 is also relevant to operation on either the suction or return side of the system and must be communicated to the sensor module 901 in this exemplary embodiment or otherwise identified by the sensor module 901. Aside from pump operation pressure changes and environmental factors such as changes in temperature, pressure changes within the sealed column can be directly related to the changes in water level in the pool through the sensor readings.

Figure 3:
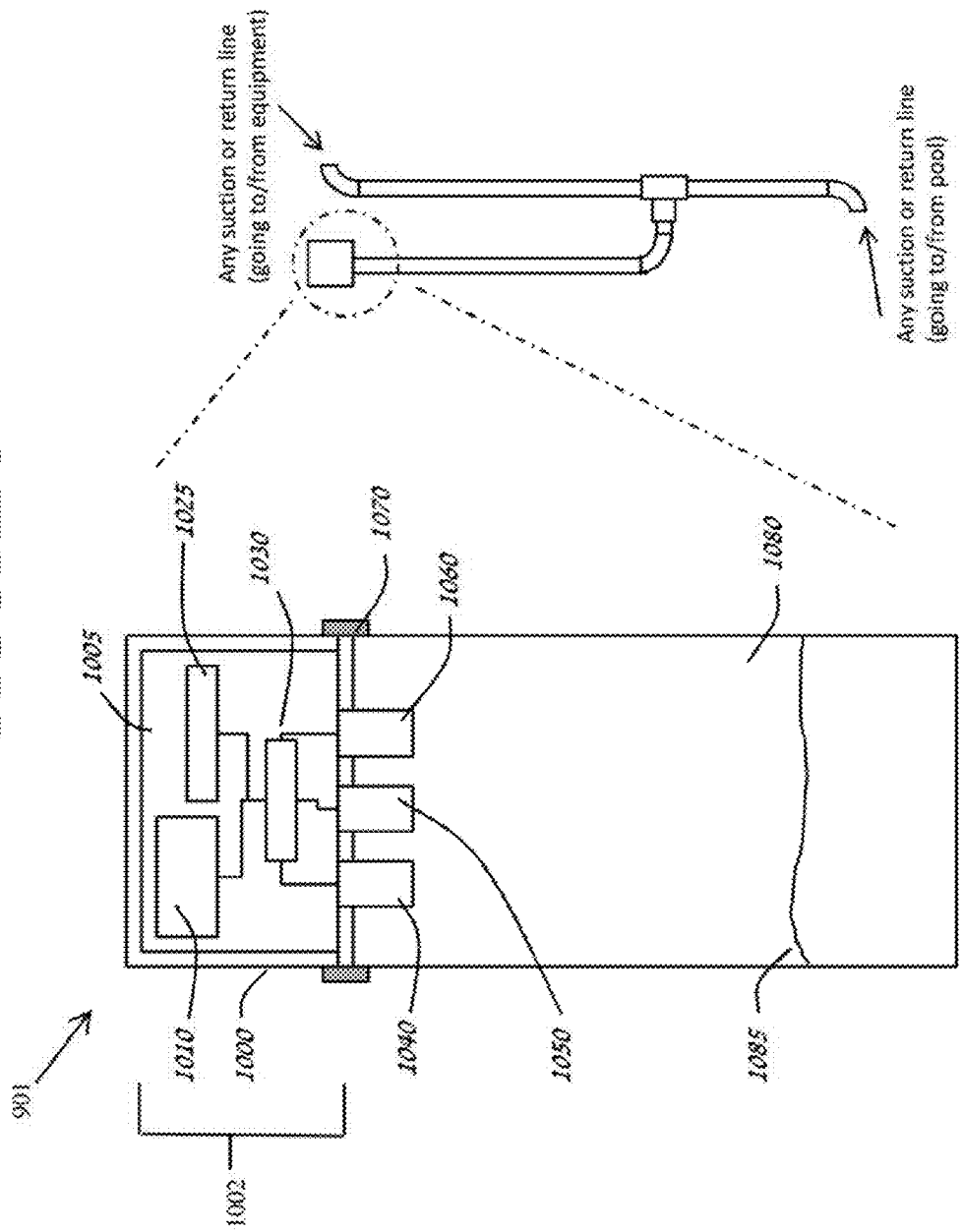
FIG. 3 shows a cross-sectional view of an exemplary sensor module configuration for use in a tap line in an exemplary embodiment of the instant invention.

FIG. 3 shows a cross-sectional view of an exemplary sensor module configuration for use in a tap line in an exemplary embodiment of the instant invention. The cross section of the sensor module 901 is an exemplary embodiment of a multi-sensor module. The exemplary embodiment is comprised of at least one sensor. In the exemplary embodiment as shown a housing 1000 is provided with a controller or electronics section 1002 having a sensor controller 1005 with power management 1010, relays for switching solenoids 1025 and electronics interfacing with and controlling the sensors 1030. In addition, communications lines (not shown) can be provided to communicate with additional controllers, for example those shown (15D, 17D) in FIG. 4 and the like. Alternatively or in conjunction with the off board communications, additional embodiments can facilitate operational data storage via on board memory or through communication with external data storage devices, including the aforementioned external controllers, like the water circulation or filtration controller 15 of FIG. 2. In this way, the water level controller 10 and the sensor controller 1005 can store historical operational data. Furthermore, though wired connections are show, wireless connections can also be used.

In this exemplary embodiment, more than one sensor is operating together to compute the proper water level. In the exemplary embodiment shown at least one of the sensors is a pressure sensor 1050. The pressure sensor 1050 can be a gauge type sensor that measures air pressure in the sealed tube versus the atmospheric pressure. Alternately, the pressure sensor 1050 can be an absolute sensor that measures the pressure of the sealed chamber in relation to a vacuum. Another of the sensors 1060 measures temperature in the housing 1000 and in a further exemplary installation, a third sensor 1040 measures the height of the air column 1085 that exists in the pipe as shown in FIG. 3. The temperature sensor 1060 can be, for example, but is certainly not limited to an at least one thermistor, infrared sensors, thermocouples, bimetallic sensors, resistive temperature sensor, and the like. The pressure sensor can be, for example, but is certainly not limited to an at least one of an absolute pressure sensor, gauge pressure sensor, vacuum pressure sensor, differential pressure sensor, piezoresistive strain gauges, capacitive sensors, electromagnetic sensors, piezoelectric, optical sensors, potentiometric based sensors and the like. The height or distance sensor 1040 can be ultra-sonic, laser, LIDAR, a capacitive strip, radar sensors, time of flight sensors, and the like.

The sensor module 901 measures level changes via pressure changes exerted by the air column 1080 on the pressure sensor 1050 in the sensor module 901. The pressure in a closed system is affected by expansion and contraction of air due to temperature and other environmental conditions, thus the temperature sensor 1060 is available to compensate for these variations. This is further compounded by the amount of air that is heated or cooled due to temperature, thus the addition of the height sensor 1040 measuring the height of the column of water 1085 in a pipe with a specified height and diameter, whereby the remaining height is filled with the column of air 1080. This system incorporates the controller 1005 in the sensor module 901 with an algorithm that uses the temperature of the air column 1080 inside the pipe and the length of the air column 1080 above the meniscus of the interface with the water column 1085 to compensate for these conditions. This creates an extremely accurate and reliable water level system as the remaining changes in pressure within the chamber are directly attributable to changes in the water level of the pool with a high degree of confidence and accuracy.

A pressure compensation mechanism, here a mechanical seal 1070, is provided for mechanical release of air during cycling operations of the circulation system. As noted a measurable volume or column of air 1080 is entrapped above the column of water 1085 in the tap line 900. A portion of the water filled column 1085 formed by tap line 900 is also shown. Importantly, the controller 1005 prevents all the water in the column from being circulated out during operation. That is, at least one of the water level module controller 1005, the water level system controller 10, the filtration system controller 15 and safeguards built into the filtration system through additional sensors or measuring devices ensure that the water within the system maintains a minimum level within the tap line 900 even when the pump is operational so as not to evacuate the tap line 900 entirely. In the exemplary embodiment provided, this signal is communicated with the water level controller 20 or the pool systems controller 15 as seen herein below in FIGS. 4-9B.

In this way, the air pressure within the column of air 1085 that is governed by ideal gas laws and changes in pressure within the column of water 1080 act on the volume of air in the column in a known fashion to increase and decrease the volume and change the pressure of the air 1085 in communication with the sensors 1040-1060. This directly correlates to changes in water level within the pool or spa. It is also possible to measure the level of the column of water 1080 directly for changes, as is noted in the exemplary embodiment of FIGS. 4 and 6. The correlation of pressure in relation to volume as described by the ideal gas laws (derived from Boyle's and Charles' laws) which govern the relation of pressure, temperature and volume of an ideal gas in a closed space.

When a temperature change occurs in the environment, it propagates to the air column. An increase in temperature causes the air to expand and vice versa. When air expands, it causes an increase in pressure and volume of the air column. It is required to offset this pressure reading from the pressure reading associated with the pressure calculation which is a product of rho ($\rho$), the gravitational constant (g) and the height in the pool ($h_{pool}$) or $\rho*g*h_{pool}$ to correctly measure the differential pressure occurring due to changes in the water level. The change in the pressure is related to the amount of air in the air column and the pressure exerted on it by the water column. Since in the exemplary embodiment, the system is a tube of equal radius throughout, we see that the change in pressure through volume is related to the height of the air column. This also allows for measurement via a changes in the height of the column of water, as described herein below.

One exemplary embodiment of the instant invention, as depicted in FIG. 3, measures the pressure changes in the sealed chamber formed by the sensor module and the tap line to determine if any change has occurred to water levels in the pool. The change in the air column height correlating to a measurable change in the pool water level. When the air column heats or contracts due to environmental constraints, the pressure change is significant compared to the pressure change occurring as a result of $\rho*g*h_{pool}$. If $h_{pool}$ is constant, this pressure change pushes or pulls the meniscus of water in the tube so that the change in height of the air column hair is proportional to the pressure change, one again calculated as P_offset=$\rho*g*h_{air}$. Now, if the pressure external water height $h_{pool}$ was to change, its effect on the air column height (when temperature is same) is very small, requiring highly accurate sensors. Further, the temperature changes can affect the measurement, these changes can be measured to ascertain whether the change in air column height is due to the temperature of air column or changes in $h_{pool}$. These can be factored into the calculation to improve accuracy.

In the instant invention, adjustments are being made as the environmental conditions and state of the air in question fluctuates. To obviate some of the assumptions of the ideal gas laws and allow for compensation due to these environmental factors additional data can be used in the calculations. Thus, pressure, water temperatures, ambient air temperatures, and other factors can be used to adjust the sensor input data that report the resulting changes in the volume and thereby can be more accurately related back to changes in the actual water level in the pool 1. The volume method of calculating the change in the height of the column of air 1080 correlating it to the water level change in the pool 1 is used in the exemplary embodiment of FIGS. 4 and 6. That is the pressure within the tap line 901 is measured by the sensor module 901 and correlated to changes in the height of the water in the pool through differential pressure changes within the tap pipe.

Additional variables can also be ascertained and communicated to the water level control 1005 or through the filtration system control 15. These can include for example, but are certainly not limited to, pool temperature, ambient air pressure, humidity, elevation, geo-spatial positioning, address, city, state, pool size, water body type and/or combination, absolute humidity, relative humidity, vapor pressure, and similar environmental characteristics relevant to the operation of the water level system, filtration system or pool, spa, fountain or water feature. These environmental factors can be utilized in more accurately rendering measurements of water loss in the pool, anticipated water loss in the pool, historical data for analysis by the water level system or the filtration system for additional tasks such as, but certainly not limited to, energy management or leak detection. These further environmental variables can also be measured by additional sensors on the pad site or throughout the pool or filtration system 15.

Referring here again to the exemplary embodiment of the sensor module 901 of FIG. 3 and the exemplary embodiment of the filtration system schematic of FIG. 2, these are exemplary embodiments of the instant invention working from a tap line 900 on a pressurized line in the filtration system in a pool as depicted. Several embodiments can utilize variations in the sensors and/or pressurization and sealing in the system to achieve similar results. Some non-limiting examples follow in FIGS. 4-9B.

Figure 5:
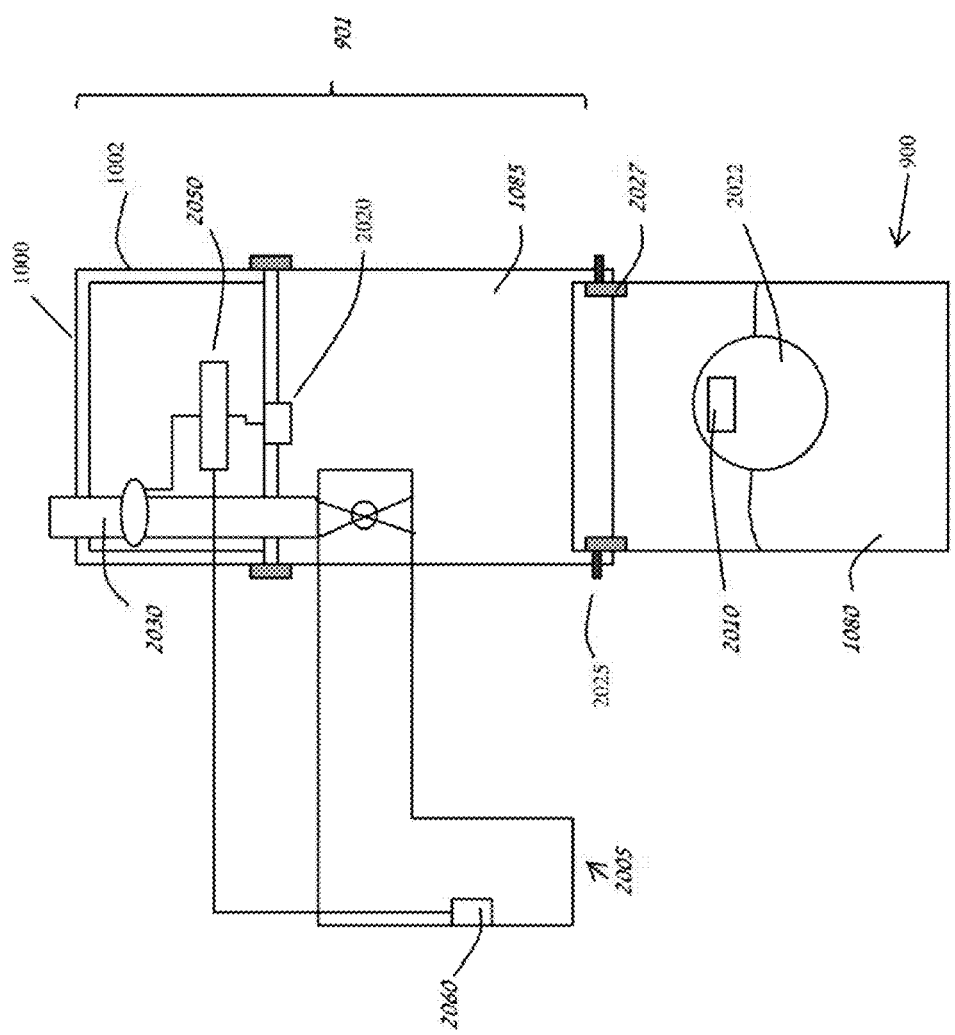
FIG. 5 shows a cross-section of an exemplary sensor module configuration with an atmospheric pressure outlet in a tap line that switches to a pressurized system in an exemplary embodiment of the instant invention.

FIG. 4 shows a schematic view of an exemplary embodiment of the instant invention sensing water level from a tap line coupled to a return line in the filtration system. Again, the embodiment shown provides for a pool 1, a skimmer box 30, a drain 45, a suction line 40, a pump 60, a filter 70, a return line 50, and a controlled valve, for instance but not limited to a solenoid valve 85 coupled to a valve and controlling inflow from the water source line 90. A similar controlled valve 100 is provided to control a drain or out to "daylight" the system. A further and separate master controller 15D is provided. Controller 15D provides for and is in communication with one or more actuators, lights, pumps and other sub-components 17D of the pool 1. It is also in communication with the water level sensor module 901 via communication line 905, which is further in communication via line 910 with and controlling the solenoid 80 in control of the check valve 85 which in turn controls input from the water source input line 90. Thus the operations of the water level control board 1005 and sensors 1040-1060, as best seen in FIG. 5, can be communicated to a master controller 15D. A further exemplary embodiment of the sensor module 901 is also provided, as further described in relation to FIG. 5 herein below. In the exemplary embodiment of FIG. 5 the water tap line 900 is generally unpressurized and open to atmospheric pressure except when the pump 60 is operational.

FIG. 5 shows a further exemplary embodiment of a sensor module of the instant invention. The further exemplary embodiment as shown utilizes a similar tap line 900 into an actively pressurized return line 50 of the pool 1, for example the tap line 900 shown in FIG. 4. The tap line 900 with the sensor module 901 thereon is provided with an open end 2005 that allows for atmospheric pressure to be exerted within the tap line 900. A level indicator 2010 is inserted within the tap line 900. The level indicator 2010 can be, for instance, but is certainly not limited to a floating ball 2022 with a coating, a chip or similar level indicator 2010 that can be sensed by a sensor 2020 in the sensor module 901 within the sensor housing 1000 on the tap line 900. The sensor module 901 is in communication with the controls for the pump 60. When the pump 60 begins its pre-check for operation, a valve 2030 shuts off the open end 2005 of the tap line 900 to the atmosphere.

A check valve or similar actuated device can be utilized as the valve 2030 to prevent air from siphoning into the system or being pushed out of the system during operation of the pump. Similarly, control of the valve 2030 can be utilized to equalize pressures gradually to atmospheric so as to avoid rapid equalization upon opening. As such, an electronics section 1002 is atop the sensor module 901 which contains leads 2050 for power and communication with the valve 2030, the sensor 2010 and an overflow sensor 2060 to monitor for overflow situations in case of valve failure. A set of screw threads 2025 with an O-ring 2027 are provided to couple the sensor module 901 to the pressure tap 900. Such a system would not require pressurization or equalization of pressures to account for variations in environmental factors as it is equalized with atmosphere as it is an open system, closed only during periods of operation of the pump 60. The system shown in FIGS. 4 and 5 utilizes a second method of measuring changes in the water column height 1080 in the tap line 900. This methodology makes direct measurement of the water column height 1080 via a very accurate height sensor 2020. Further embodiments like those shown in FIGS. 6 and 7A, can use both measurement methodologies.

Figure 8:
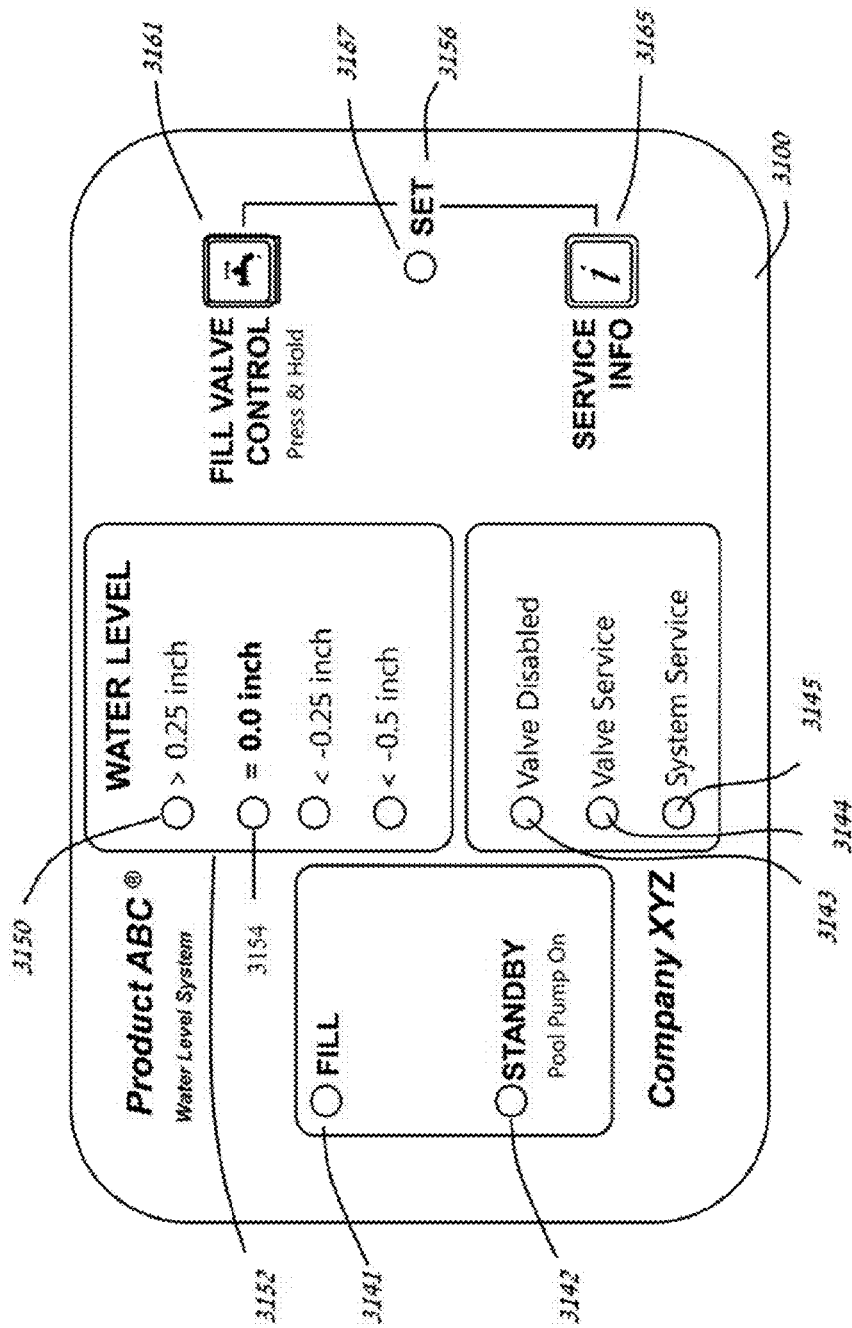
FIG. 8 shows an exemplary embodiment of a user interface for an exemplary embodiments of the water detection system.

FIG. 6 shows a schematic for a further exemplary embodiment of the invention. Again, similar to FIG. 2, a pool 1, a skimmer box 30, a drain 45, a suction line 40, a pump 60, and a filter 70 are provided coupled to the pool 1. Similarly, a main return line 50 is provided. A sensor module 901 is provided mounted to the plumbed tap line 900. Atop the sensor module 901 is a water level and pump controller 3000. The system incorporates control of pump 60 into an overall filtration system controller in the master controller 3000. A user interface 3100 is provided atop in an enclosure. An exemplary embodiment of the user interface is shown in FIG. 8. In addition to controlling the water level detection system and the controlled valve 85, and thereby water source line 90, the controller 3000 is coupled directly to the pump 60, this can for example be a "smart" pump with speed and other controls that can be controlled by a master controller which the controller 3000 is acting as in this instance. Additional communications lines 3105 can be extended to the filter 70. Power can be routed through the controller if a distribution system is provided or alternatively it can be routed directly to the individual subcomponents through a power bar or similar distribution mechanism (not shown).

In this instance, the power and operational information from the pump 60 and the filter 70 are directly communicated to the controller 3000. The controller 3000 in turn also receives input from the sensor module 901 and its controller 1005. In this instance a further exemplary embodiment of the sensor module 901 is provided with pressure equalization and ultrasonic height sensors in a multi sensor arrangement as further described herein below in relation to FIG. 7A. The data regarding the level of water in the system is stored in a memory storage device (not shown), here persistent RAM memory, in the controller 3000. This is used in estimating usage and more accurately predicting and monitoring the loss and replacement of water in the system. Additionally, the system can provide communication via a wireless signal 3500 to a gateway 3200 than can also act or have as a user interface and/or directly through a network 3300 and thereby to a cell phone or tablet user interface 3400.

In this fashion, the operation of the exemplary embodiment of the invention in FIG. 6 functions in a manner similar to the previously disclosed exemplary embodiments of FIGS. 2 and 4 above, with additional, highly accurate height sensors in the exemplary embodiment shown measuring changes in the column height of the water column in a tap line 900 extending from the return line 50 of the pool. As noted previously, the pressure, column height, and temperature are related and sensed to accurately detect changes in the level of the water in the pool 1.

Figure 7A:
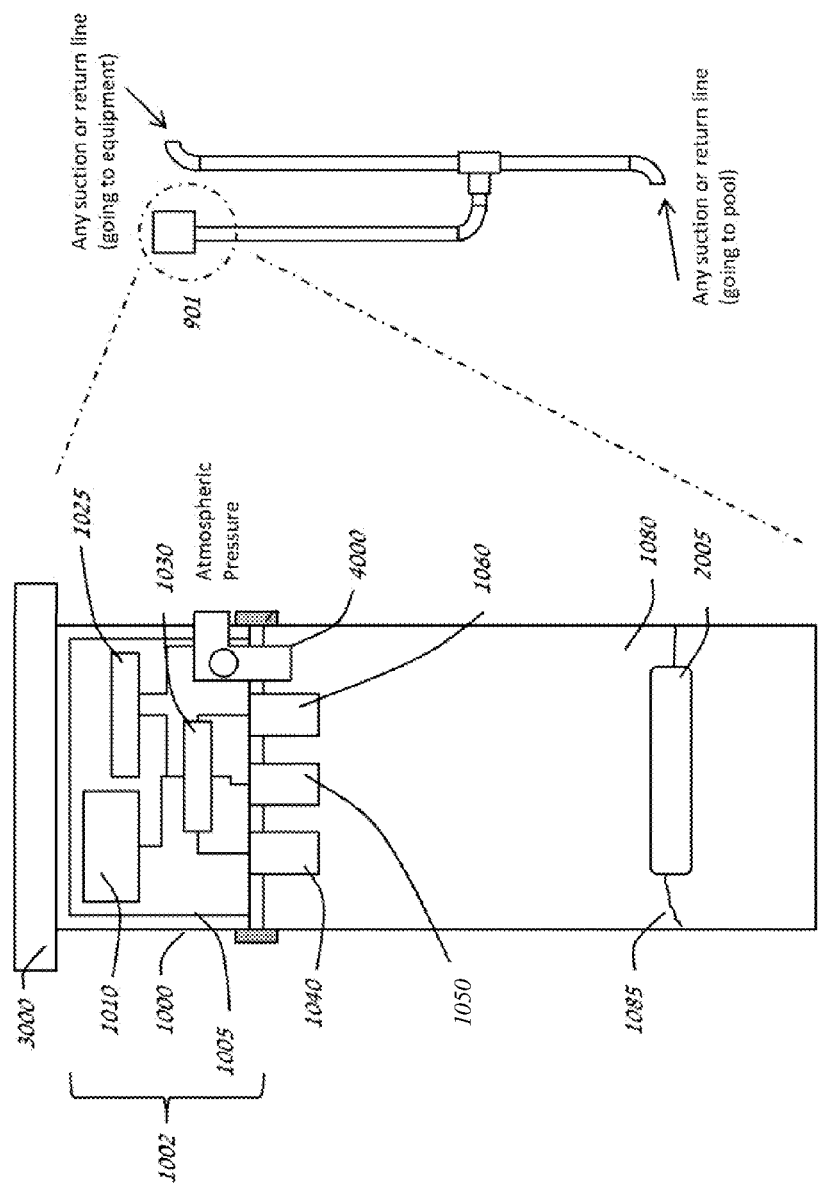
FIG. 7A shows a close up of a further exemplary multi-sensor configuration utilizing a tap line with a valve opening to atmospheric pressure.

FIG. 7A shows a cross-section of a further exemplary embodiment of a sensor module. A close up schematic view of a further exemplary multi-sensor configuration utilizing a tap line 900 with a valve 4000 selectively opening to atmospheric pressure is shown. The exemplary embodiment is similar to the embodiment shown in FIG. 3. The housing 1000 is retained with an electronics section 1002 having a water level controller 1005, here a circuit board with a special purpose semiconductor chip having operating code programmed thereon and electrical couplings, is provided. On the water level controller 1005 are connections forming a relay communicating with the controlled valve 85 for switching the valve on the supply line 90 and a relay for switching a vent valve 4000 for balancing pressure within the sensor module 901. A further component coupling the sensors 1040-1060 to the controller 1005 is provided. Similar to the previous exemplary embodiments the pressure sensor can be, for example, but is certainly not limited to an at least one of an absolute pressure sensor, gauge pressure sensor, vacuum pressure sensor, differential pressure sensor, piezoresistive strain gauges, capacitive sensors, electromagnetic sensors, piezoelectric, optical sensors, potentiometric based sensors and the like. The height or distance sensor 1040 can be ultra-sonic, laser, LIDAR, a capacitive strip, radar sensors, time of flight sensors, and the like. In the exemplary embodiment shown the column height sensor 1040 are comprised of ultrasonic sensors. The water level controller 1005 in turn communicates with the master controller 3000 located atop the sensor module 901 or, alternatively, through a wired or wireless communications line to the controller 3000 located in a separate housing similar to that shown in FIG. 3.

The sensor module 901 of FIG. 7A is different from that of the exemplary embodiments in FIGS. 3 and 5 above. As the vent is provided with a controlled actuator it can manage the pressure in the column based on system and environmental variables through a period described as a vent cycle that would typically introduce inaccuracies into the system. The reliability of the system depends on the preservation of the conditions of the column of air over the period of time from when the vent cycle occurs and a set point is established to the point at which a measurement needs to be made. The air column can be disrupted during this period for many reasons. Some non-limiting examples include when a portion of the air column get sucked up by the pump because the water level in the tube was not high enough. Another source of disruption can occur from air entering the system when drawn into the line from vacuum line, skimmer line, or from leaks and the like. There can also be micro leaks in the gaskets in the systems. This shortcoming resulted in the addition of the controlled vent 4000, shown in a non limiting example as a solenoid controlled vent valve, which aids in resolving these issues.

Thus the embodiment shown in FIG. 7A uses the solenoid controlled vent 4000 to zero the pressure differential between the atmosphere and the air column 1085 in the pressure tap 900. The desired height of the meniscus of the water column 1080 is identified via the ultrasonic sensor 1040 during setup. At every vent cycle the changes in height are re-measured via the ultrasonic height sensor. The venting is controlled by the solenoid 4000 which opens the vent 4005. In the exemplary embodiment, pressure is vented in several instances. If the pressure changes in the sensor module 901 since the previous vent cycle indicates that there is a water level change. The system is then vented and re-verified. This defines a venting cycle, the act of venting and then re-verifying the height of the water column 1080.

Thus, at the beginning and end of every vent cycle the pressure difference is zeroed out. This is registered in memory and serves as the zero point for future readings. If the pump cycles, the vent is off when the pump comes on to prevent water from being pumped out of the tap line 900. After the pump 60 is turned off the vent 4000 is cycled and pressure is equalized. This can for example, but is certainly not limited, also eliminates any bubbles or other trapped air in the system from being entrained in the tap line 900 from the movement of the water. Finally, a cycling of the vent 4000 can also be called for after a specified duration of time has passed without venting. The pressure set through the venting cycle is also used to identify when the pump comes on, which is also communicated from the pump 60 to the master controller 3000 in the exemplary embodiment shown. If the pump comes on, the system closes the vent within milliseconds. During periods of pump operation, pressure within the chamber is affected with spikes that are measurable by the sensors and, thus, detectible without direct communication. This can be used as an added safeguard and check on the operations of the system, as described herein below. This also permits the definition of a period of time for a specific vent cycle to occur.

Alternatively, instead of the at least one pressure sensor 1050 indicating pressure changes and then initiating a venting cycle, a similar system using the at least one column height measurement sensor 1040 can identify when the water column was falling at a rate to indicate that the pump was on. However the measurement using a single height sensor is susceptible to false readings, especially when the water level in the tap line is very low or the pump comes on at low speeds. Upon venting in such a system, the system re-verifies the heights with the column height sensor 1050. If the water is below a threshold value, it turns the solenoid 85 on and admits water. It once again uses the tap line 900 to monitor the water as it fills. In all the exemplary embodiments, the water level control system has alarms so that if it does not detect water level increases when the fill valve 80 is on or the system detects shorts or "open" conditions in external solenoids or gets unexpected values returned in any of its sensors the pump is shut off. Similarly the valve 80 may also be shut or locked down to stop filling altogether when an override switch, as better seen in FIG. 8, is engaged to allow for a leak detection process. In so doing, the system helps prevent catastrophic failure of the system.

In either case, the vent cycle begins with storing of the pressure and/or height measurements by sensors 1040-1060. The cycle begins and measurements are still made but no determination of level changes can be made during this time. Once pump operation has ceased, pressure measurements are made and compared against the stored values, and the pressure equalization valve 4000 is engaged to equalize the pressure to the previous measurement with the ability to compensate same for any changes in environmental variables, as noted above. The equalization valve 4000 is then shut. A pause in operation can be used to allow time for settling in the system and equilibrium to be achieved. A further measurement is then made and a new determination of the water level in the pool 1 is made.

Figure 7B:
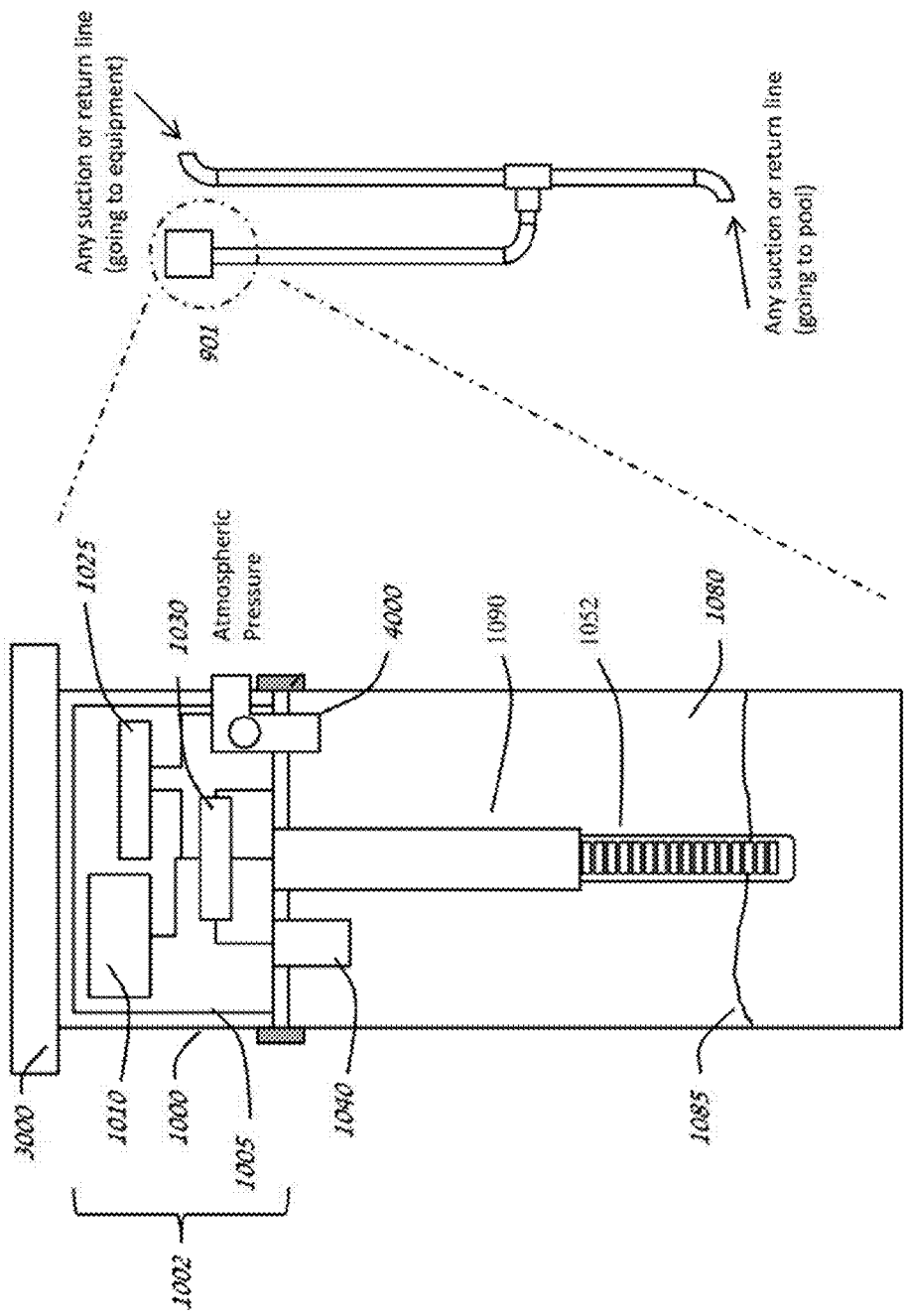
FIG. 7B shows a close up of a further exemplary multi-sensor configuration utilizing a tap line with a valve opening and a capacitive sensor strip.

FIG. 7B shows a close up of a further exemplary multi-sensor configuration utilizing a tap line with a valve opening and a capacitive sensor strip. The components are substantially similar to those shown in FIG. 7A. These include a housing 1000, an electronics section 1002 having a water level controller 1005 with a special purpose semiconductor chip 1045 having operating code, a relay 1005 communicating with the solenoid 80, a vent valve 4000 for balancing pressure within the sensor module 901. A further component coupling the sensors 1040-1060 to the controller 1005 is also provided. In the exemplary embodiment shown in FIG. 7B the column height sensor 1050 of FIG. 7A is shown as a capacitive array 1052 that is in contact with water 1085. The height sensor 1052 is held there by a precut extension piece 1090, the extension piece is cut so that its length is specific to the application and the sensor 1052 is held at a specific height to detect in a specific range along the length of the tap line 900. The board controller 1005 in turn communicates with the master controller 3000 located atop the sensor module 901 or through to other outside controllers as disclosed above to facilitate fill and/or drain operations. Similar vent operations may be carried out as described above in relation to FIG. 7A.

Additionally, as seen in FIGS. 2, 4, and 6, a further unique aspect of the exemplary embodiment of the system is the added ability to operate the sensor module 901 as well as the solenoids 85 or actuated valves 4000 of the water level system 5 using existing pool and spa equipment. Automation for the operation of the pool and spa equipment is becoming standardized in the industry. Various panel and computer based control systems in the pool industry have adopted a common connector for motorized valves, typically a three pin connector. The exemplary embodiments of the systems thus can use, but are not limited to, a three pin coupling system to provide the system with interchangeability and compatibility with existing systems. It is this circuit that allows this system to simply "plug and play" without the need for additional power couplings.

Figure 7C:
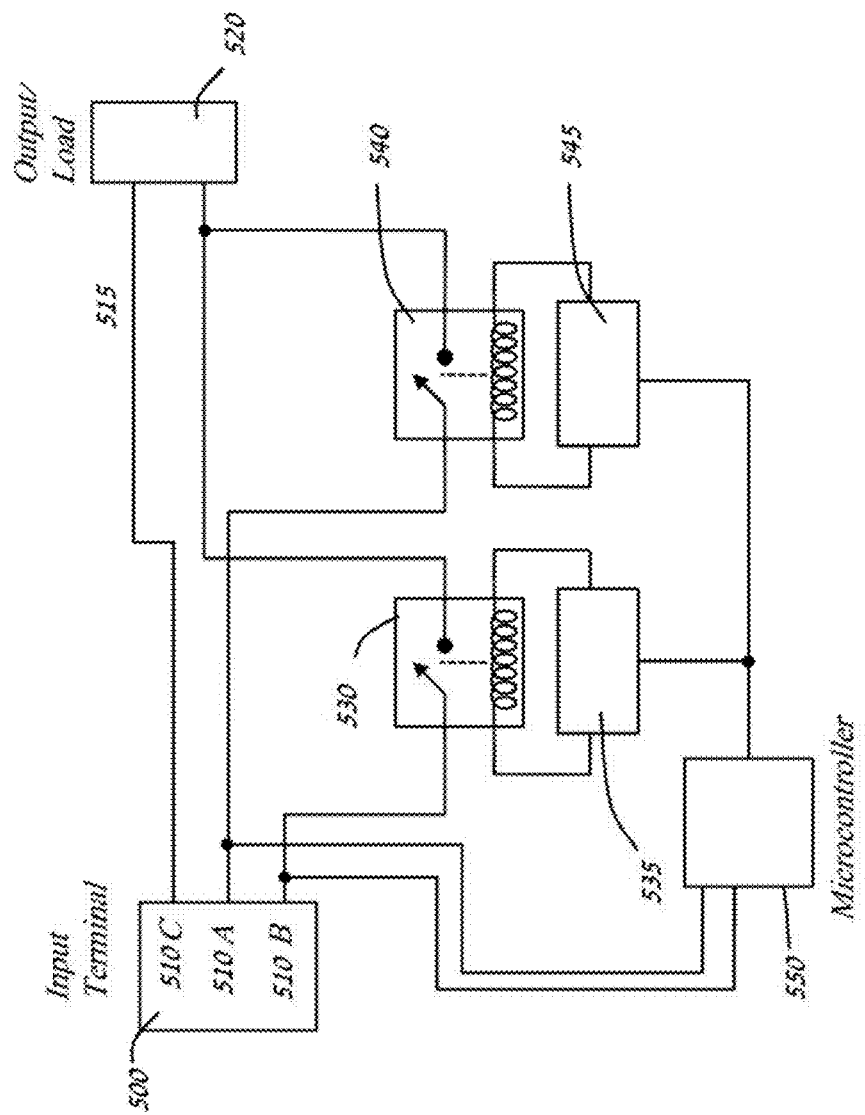
FIG. 7C shows a schematic block diagram for a multi-pin controller of an exemplary embodiment of the invention.

FIG. 7C shows a schematic block diagram for an exemplary embodiment of a multi-pin controller circuit for powering any of the exemplary embodiments of the invention. In this control circuit, a 3 pin connector 500 is provided and acts as a power source using selective powering of the load 520, in this case for instance the water level system. The connector has three pins 510A, 510B, and 510C. It drives the load 520 as an output. As depicted, but certainly not limited to this configuration, pin 510C is a common line or ground and indicated as such with line 515. The 510A and 510B connectors selectively power relays 530 and 540 respectively based on the direction that the actuator is being turned in the above noted example of the switched solenoid. Switched relays 530 and 540 can be any appropriate switching device, a non-limiting example being a solid state relay. The relays have drivers, 535 and 545 that are engaged when the respective relay 530, 540 is engaged. A microcontroller 550 senses where power is coming from before switching relays and selectively engaging one of the paths to the respective switched relay 530, 540. This in turn permits the configuration to power the load 520 through either pin 510A or 510B by selectively closing the respective relay switch 530, 540. Thus, the three-pin connector in an existing system can be used to power the exemplary embodiment of a water level control system from existing equipment.

The three pin connection as described allows 24 volt AC to power not only the sensor module 901, but also the valve 85 that can attach to an outside water source line 90 and, either through city water or irrigation lines, this allows water to flow into the body of water. This requires no additional electrical requirement, installation or labor, as the standard pin connection is utilized for power. It is all low voltage and safe for the consumer. This is the case for all the exemplary embodiments shown in FIGS. 2, 4, and 6 above.

The exemplary embodiments of the water level system 5 described above in FIGS. 1-9 can incorporate a number of safety features due to unique method of operation of the exemplary embodiments and the controllers thereon. These include determination of real time "on" detection through multiple redundant sensor points for water circulating pumps 60 that allows this system to add water only when the water circulating pump is not operating. The operation of the circulating pump 60 can potentially disturb the true water level measurements and create false readings, as noted above. The water level detection system 5 can detect sudden changes in pressure or vacuum and can send commands to the circulating pump 60 to shut it down to protect from potential entrapment caused by an open leak or other point of failure draining the pipes, adding excessive volumes of air to the piping system, and/or protect the equipment from overpressure damage from filling operations occurring during pumping operations. The system can also detect and report water leakage or excess water usage conditions to avoid unnecessary and costly water waste. This is based on programmed analysis from the outside variables, as noted above, which allow for a profile based on location or similar known environmental parameters to be stored and measured.

Alternatively, it can be also be based on historic usage data as well, stored on the water level system controller or on other data storage devices or controllers coupled to the water level system. This can also use a combination of both historic data as well as programmed or sensed environmental data to determine an expected average water dissipation rate and sense when the rate can be outside the normal. It can include a fill cycle that would allow for filling based on values over this amount but with warnings or a determination that the fill has occurred too often at this rate and then alert a user. Additionally, an override can be provided to accommodate droughts or sustained dry conditions and the like, as shown in FIG. 8.

Reference is made to a fill cycle, which is the cycle by which the system typically adds water to compensate for losses from evaporation. It should be understood that fill cycle also embraces adjusting for additive phenomenon, such as rainstorms, that add water to the pool. As shown in the figures, the pool is provided with a drain and the drain "daylights" to a sewer. The treated water of the pool, though more often requiring adjustment from losses, can also be removed from the system. Such a fill cycle would be a negative fill cycle or draining cycle to remove from the level of water in the pool. As noted above, this operation would be facilitated through the controller 10,15D, 3000 and, in an exemplary embodiment, an actuated valve 100 in communication with the controller 10,15D, 3000.

In addition to filling to a set point target, the exemplary embodiment of the controller of the invention, as described in any of the exemplary embodiments herein in relation to FIGS. 1-9, can dynamically adjust the set point target using a dynamic adjustment operation or routine. That is an operation or routine whereby the target set in the controller may be varied by small increments above or below an initial point so as to avoid a persistent level that may result in discoloration and accumulation of unwanted growth in as a ring or similar development in the side of the pool over prolonged usage. This incrimination can be done based on a timer or based on a number of duty cycles or a similar measure of the passage of operating time at a specific target point or setting for filling or draining operations, filling or draining operations having been noted herein.

One non-limiting example of such a dynamic fill target can be achieved by counting fill cycles, as defined herein for operation of the water leveler system, and on every third cycle adjusting the target lower by about one-quarter to one-eighth of an inch. After two such adjustments, the dynamic fill counter function of the dynamic fill operation would reset to the original fill value. Variation in when the adjustments are made, both in counting mechanisms and frequency, as well as specific incremental values upward or downward are contemplated by the invention and can be implemented in further embodiments of the controller of the water leveler system.

The level detection system 5 can also utilize the pressure differential to determine whether the fill has reached an absolute level. In some filtration pump systems, even when the pump is off and filtration system is filling, the city water flowing through an input line 90 and released by the controlled valve 80 causes a change in the hydrostatic pressure. The effect of the open solenoid valve 80 can cause a pressure change that is higher than the target pressure of a fill operation as calculated by the instant invention. To compensate for this the level detection system 5 through its controller 1005 of the instant invention can provide an offset of the target pressure to account for the instantaneous pressure spikes that appears when the solenoid valve 80 is turned on. The level detection system 5 of the instant invention can also monitor the instantaneous changes in the pressure due to changing demands on the water supply line 90, for example but certainly not limited to when a toilet flushes or the like, to avoid errors in the fill operation. The controller 1005 can include code segments designed to account for these changes in pressure to guarantee a high level of precision in the fill rate calculated by the instant invention.

The level detection controller 1005 can also be adapted to allow the system to work with negative edge pools or by monitoring real time fill rates during fill operations. The negative edge or infinity edge pool systems, by design, over fill and pour off the "edge" of the pool into a drain system. When the level detection system 5 starts filling water in a fill operation from the water supply line 90 by opening the solenoid operated valve 85, it is targeting a "fill point" that has a very low error margin sometimes beyond the error margin of the instant invention as the as water cannot go above the negative edge as it will overflow. To overcome this issue with the pool water level in such pools or as a further method of operating a fill operation, the level detection system of the instant invention starts filling the system and observes the actual, real time rate of fill. This can be enabled in a number of ways, for instance, but certainly not limited to, through the addition of a flow sensor in the solenoid controlled valve 80. If the increase in height measured by the system is not proportional to the rate of fill at a particular point, i.e. the water going in is not being retained to increase the level of water in the pool, the water detection level controller 1005 of the invention stops filling. This can also be done to control input on non-negative edge pools.

The water level system 5 can also be adapted to automatically drain excess water. As noted, because the water level detection system 5 can constantly monitor the water level during either a fill or drain condition, the system is "smart", that is it can identify if too much water has been drained or too much water has been added. It can close or open the necessary valves as well as report the condition of the water level to a user. For instance, it can open a controlled valve 100 to drain the system as shown in FIGS. 1-9 to drain water from the pool 1. A further drain line to an external drain or sewer (not shown) can be provided to remove excess water from the system. The water level detection system controller 1005 not only sends a signal to valves to operate both the fill and drain, but can also monitor current consumption on a regular basis over extended periods of time, guaranteeing that the valves were operating properly assuring more consistent fill and drain through a variety of conditions. All of these conditions can be reported to the customer through a user interface either locally or through a network as shown in the FIGS. 1-8 and can also be stored as historical data for use in further management of the water level detection system 5, the pool filtration system, or both.

FIG. 8 shows top view of an exemplary embodiment of a user interface. The water level system can be provided with its own user interface 3100, as shown in FIGS. 6 and 8. A multi LED panel 3150 is provided that shows water level 3152 in the pool or spa 1 both above and below the set level 3154. It is provided with user inputs 3156, here buttons, to adjust settings and input information. It has the ability to change the level easily and conveniently from this panel. It can also be used to diagnose issues and provide key information to both the consumer and installer on the operation or non-operation of the unit. It also has the ability to communicate all data via RS 485 communication protocol or via a wireless interlink and can be set to directly communicate with some of the newer smart pumps and operate them for safety and reliability.

The depicted multi-LED interface 3150 is only one of many types of interfaces that can be used alone or in conjunction with others to control the water level system. Alternatively or in addition to the multi-LED user interface, the user interface can include a smart phone or tablet device or the like, shown schematically, with a programmed user interface appearing on the display for indicating, amongst other parameters, pool water level and the condition or state of the pump and any other desired variables. The level being set and controlled as part of such a user interface in a manner similar to the LED interface shown. Additional indicator lights 3141, 3142, 3143, 3144, 3145 are non-limiting examples of the type of indicators that can be provided to indicate status of various sub-systems, operations status of subsystems, and operations in progress. Some non-limiting examples of such sub-systems include, but are certainly not limited to, a water purification system, pH balancing system, softener system, chlorination system, heating system, filtration system, pumping system and the like. Alone or in conjunction with these sub-systems, the controller can be adapted to monitor data regarding at least one of temperature of the water, salinity of the water, pH of the water, rate of evaporation of the water, rate of loss of the water, rate of fill of the water, pressure in the water level detection system, humidity, detected pump speeds, pump status, amount of water added, dilution rates, salinity, abnormal fill conditions, and the like.

For instance, a "Fill" light 3141 indicates when filling operations are being conducted. A "standby" light indicates that the fill operations are locked out due to pump operations. User inputs 3161 and 3165 are also shown as non-limiting examples of some of the types of inputs provided for user input and instructions. For example, a manual override for the fill valve control is provided as button 3161 and a service/info button 3165 is also provided. These buttons can be used to input set data, as indicated by the condition indicator "set" provided as a further example of the user interface output 3167.

Figure 9B:
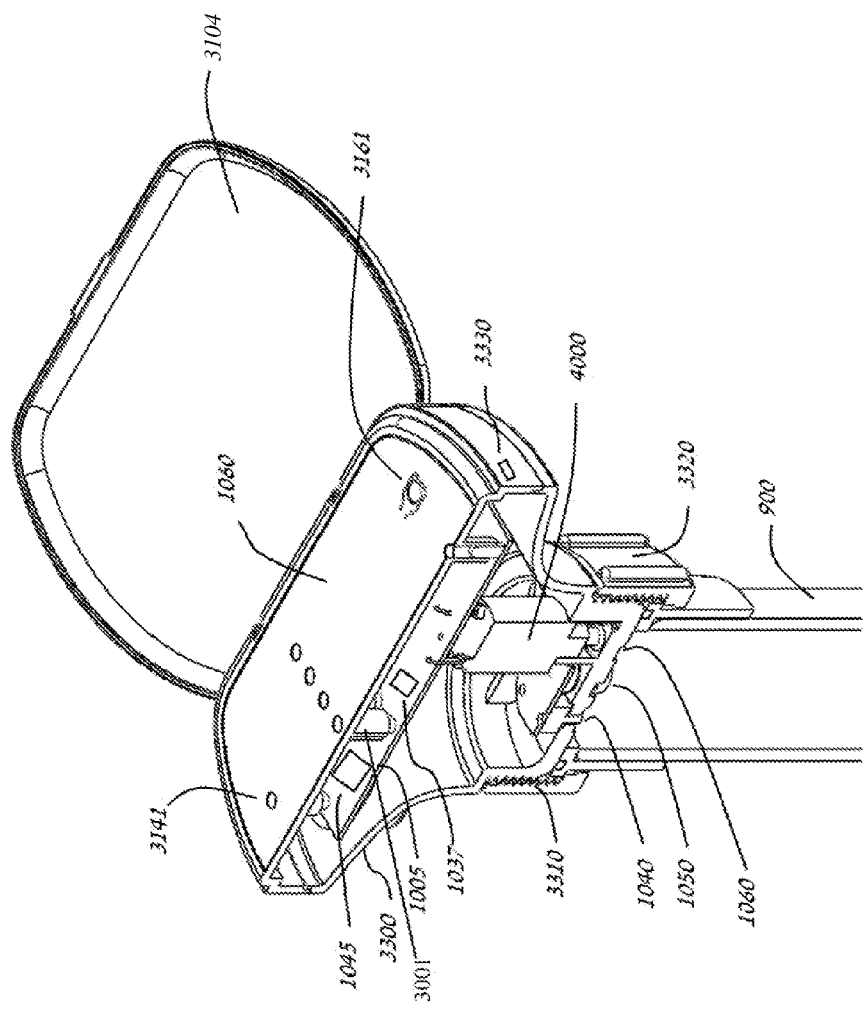

FIGS. 9A and 9B show an isometric view and further cross sectional view of a further exemplary embodiment of a user interface and controller of the instant invention. As seen in FIG. 9A, a sensor module is provided with an integrated user interface 3100 having a hinged cover 3199. A set of lights 3150 are provided to indicate the pool level and the adjustment level values. A singular housing 3300 contains the user interface 3100 and the controller 3000, the housing 3300 being coupled to the tap pipe 900 via a threaded coupling 3310 with a screw on coupling member 3320, as best seen in FIG. 9B. A communications port 3330 is provided on a side of the housing 3300 to facilitate wired communications and power inputs. Additional communications ports and power inputs can be included for further hardwired coupling with additional filtration system components and the like. Alternatively or in addition, wireless communication links (not shown) can be provided.

As seen in the cross section of FIG. 9B the housing 3300 is provided containing the water level controller 1005 which includes the components of the graphical user interface 3001 on it. The controller 1005 also communicates with the sensors 1040, 1050, 1060 and an actuated pressure relief valve 1075. A vent or relief valve (not shown) can be added as show in the exemplary embodiments of FIGS. 2 and 7A which allows the controller to equalize pressure in the tap line 900 as needed, in a fashion similar to that described herein above. On the user interface, additional indicators are provided. A pump status indicator 3141 is provided to indicate the pump 60 status and an override switch with indicator 3147 is also provided.

In addition to the functions and operations described herein above with respect to this and other exemplary embodiments of the controller, the water level detection controller 1005 in the instant exemplary embodiment provides enhanced functionality with respect to the operation of the water level detection system 5 and the water circulation and filtration system. The water in the tap pipe 900 can grow foul over substantial time if it is stagnate. As noted above, the water 1085 in the tap pipe 900 is coupled to a dynamic pipe, i.e. a pipe on the suction or supply side of the water filtration system. To flush the water 1085 in the tap pipe 900, the actuated vent valve 1075 similar to that shown in FIG.

5, is temporarily opened. This allows the controller 1005 of the water lever system 5 to drain the water from the tap pipe 900 when the pump 60 first comes on, essentially dropping the level of the water 1085 in the pipe 900 so long as the vent 1075 is opened or similarly raise the level of the water 1086 in the tap pipe 900, thus moving the water. This can also be but is not limited to being done as part of a periodic service function on a timer every few days or the like.

The changing height in the water tap pipe 900 is measured by the sensors 1040, 1060 which work to identify when a particular level point of the water 1085 up or down the pipe 900 is reached and signal the water detection system controller 1005 to then turn off the actuated relief vent 1075. For instance, if installed on a suction side, the level of the column of water 1085 in the tap pipe 900 is drawn down, for instance to the juncture of the tap pipe 900 with the plumbing of the circulation system and the relief valve vent 1075 is shut. When the pump 60 completes its operation, the column of water 1085 returns to the tap pipe 900 at a height representative of the height of the water in the pool, spa, fountain, water feature or similar body of water. As noted above in the embodiment of FIG. 5, the vent 1075 can also be cycled to equalize pressure before a further measurement of the level of the water 1085 which is then related to the level of the water in the pool 1 to assure accuracy and removal of entrapped air and the like.

As noted previously, the water level detection system controller 1005 can detect entrapped air that has been admitted through agitation, circulation and the like. Reference is again made to the suction side, however, similar operations can be utilized on the run side of the water circulation system. When on the suction line 40, any entrapment produces a pressure readout that is significantly larger than what would be seen at normal operation speeds. For instance, if a significant amount of air is sucked in through a skimmer or a leak or lack of water in the pool, spa, fountain or water feature. These thresholds are used to trigger safety shutoff in the pump 60 directly or via the control panel if significant entrapment is detected.

The exemplary embodiment of the water level detection controller 1005 shown in FIGS. 9A and 9B, as well as those shown in FIGS. 1-8, of the water leveler system that is coupled to the water leveler integrates additional data inputs through the data ports 3330 in its operation as well as provide additional data to other systems in the pool filtration system. This can include for instance, but is not limited to data on the pump 60 speed and operation detection including such things as detecting pump speeds and identifying whether the pump 60 is on or off in the filtration system. The controller 1005 of the water leveler system can pass this information to a further controller or safety monitor panel for safety, verifying pump operation and the like.

Similarly, the system identifies when and how water is added for instance, but certainly not limited to, either through a solenoid controlled valve 80 with a supply line 90, as shown previously or rain or through other means. In such cases the water level detection system 5 through its controller 1005 can track in real time that an amount of water was added raising the water level in the pool and correspondingly the level of water 1085 in the tap pipe 900. These results can also be used in conjunction with the controller 1005 or other controllers (not shown) to indicate the amount of salt dilution, the amount of chlorine, acid and other additives that need to be added to account for the addition of water.

The water level detection system controller 1005 of the exemplary embodiment is further provide with memory storage devices 1037 for storage of historic/seasonal tracking of fill rates, as noted previously, measured by the sensors. It also detects any departure from the historic fill rates stored in memory storage devices 1037 which would indicate a leak in the pool or similar abnormality and send an alert. Other data that can be tracked, either from the water level detection system 5 or in conjunction with other components of the water filtration system, to detect abnormal operations and indicate faults or abnormal fill conditions, which alone or in combination, are observed by the controller and can be reported out in a user interface. Some examples of such conditions include when data indicates the water level system keeps filling but water level never rises, the water level system fills but the water level falls, and the water system fills more often than expected in the worst case scenario of evaporation, the pump system is operational but no discernible changes in pressure are observed, and the like.

For instance, the water level detection controller 1005 of the exemplary embodiment shown can synchronize the detection from the sensor module sensors 1040-1050 as an operations check routine. In one non limiting example of such a routine, the controller 1005 can receive information from an at least one height sensor, for instance an ultrasonic sensor, detecting the height of the water column 1085 in the water tap 900 and an at least one pressure sensor 1050 to verify the data from each other in certain operation modes such as when the pump 60 is running. If the system results in data that does not synchronize properly, it lights up service errors on the user interface 3001, for instance the pump status indicator 3150 can be made to blink. This can also occur if there are leaks in the system and the sensors detect these abnormalities. Leaks can result, but are certainly not limited to resulting from, installation errors such as if an o ring is not employed properly or if a pipe not glued correctly, and the like.

Further, as an additional feature of the exemplary embodiment of FIGS. 9A and 9B, as part of the user interface 3100, the manual override switch 3150 can be engaged such that the controlled valve 85 is disabled to prevent filling when the user is performing leak detection. Similarly, the water detection system controller 1005 can identify faults, such as but certainly not limited to shorts or open circuits on the water fill control valve 85 and similar issues with the fill operations in the water filtration system as communicated to the controller 1005. This includes diagnosing internal hardware problems such as faulty temperature sensors, height sensors, pressure sensors, vent system valves, and the various components enumerated above in relation to the various exemplary embodiments of FIGS. 1-9. In each case an appropriate user interface LED 3154, 3150, 3140 can be illuminated or an alert sent to the user through a network as shown in the Figures.

The embodiments and examples discussed herein are non-limiting examples. My invention is described in detail with respect to preferred embodiments, and it will now be apparent from the foregoing to those skilled in the art that changes and modifications can be made without departing from the invention in its broader aspects, and the invention, therefore, as defined in the claims is intended to cover all such changes and modifications as fall within the true spirit of the invention.

What is claimed is:

1. A water level detection system in a pool, spa, fountain or water feature forming a body of water within, said body of water being at a specified water level, the water level detection system comprising:

a tap line coupled to a plumbing line on a suction or supply side of a filtration system and admitting water from the pool, spa, fountain or water feature such that the change in level of the water in the tap line corresponds to a change in level of the water in the pool, spa, fountain or water feature;

a sensing module, the sensing module mounted to the tap line and having at least one sensor detecting the height of a column of water or the pressure of a column of air in the tap line; and a controller coupled to the sensing module such that the controller is adapted to collect the data from the at least one sensor that detects changes in the level of the height of the column of water or the pressure of the column of air in the tap line and thereby changes in the water level of the body of water, communicate the detection of such a change, and report such a change to initiate addition or removal of water from the body of water to adjust the water level in the body of water to a set point water level.

2. The water level detection system of claim 1, wherein the controller prior to initiating adding or removing water from the body of water confirms non-operation of a pump in the filtration system.

3. The water level detection system of claim 2, wherein the controller further locks out operation of the pump in the filtration system during the adding or removing of water from the body of water.

4. The water level detection system of claim 1, wherein the controller of the water level detection system is further coupled to and communicates with a pump controller.

5. The water level detection system of claim 4, wherein the pump controller senses the water level detection system status and communicates when the pump in the filtration system is active.

6. The water level detection system of claim 1, wherein the sensing module is contained in a housing connected to the tap line.

7. The water level detection system of claim 6, wherein the tap line is a pressurized tap pipe.

8. The water level detection system of claim 6, wherein the pressurized tap line is a selectively-pressurized tap pipe.

9. The water level detection system of claim 8, further comprising an automated pressure valve coupled to the controller and operating to allow air in an interior of the housing to selectively pressurize or depressurize to ambient air.

10. The water level detection system of claim 1, wherein the sensor module includes at least one of an at least one temperature sensor, an at least one pressure sensor and an at least one water column height sensor.

11. The water level detection system of claim 10, wherein the at least one column height sensor is at least one of an at least one ultrasonic sensor, capacitive sensors, radar sensors, and time of flight sensors.

12. The water level detection system of claim 10, wherein the at least one pressure sensor is at least one of an at least one an absolute pressure sensor, a gauge pressure sensor, a vacuum pressure sensor, a differential pressure sensor, a piezoresistive strain gauges, a capacitive sensor, an electromagnetic sensor, a piezoelectric sensor, an optical sensor, and potentiometric sensor.

13. The water level detection system of claim 1, further comprises a controlled valve controlling a water supply line coupled to the plumbing line and the water level controller or a drain line coupled to the plumbing line and the water level controller.

14. The water level detection system of claim 13, wherein the controller communicates with the controlled valve to control admission of water from the water supply line in a fill operation to a target point or fill point.

15. The water level detection system of claim 14, wherein the controller utilizes a pressure differential sensed in the tap line to determine whether the fill operation has reached an absolute level.

16. The water level detection system of claim 14, wherein the controller is further adapted to provide a pressure offset of a target pressure during the fill operation to account for instantaneous pressure spikes that appear during the fill operation.

17. The water level detection system of claim 14, wherein the controller utilizes direct measurement of the height of a column of water in the tap line to determine whether the fill operation has reached an absolute level.

18. The water level detection system of claim 14, wherein the controller further monitors the instantaneous change in the pressure to measure and compensate for instantaneous pressure changes due to changing demands on the water supply line during the fill operation.

19. The water level detection system of claim 1, wherein the controller is adapted to monitor real time fill rates.

20. The water level detection system of claim 19, wherein when the sensed increase in height of the water level in the pool is not detected to be proportional to the monitored real time fill rate at a particular point the controller stops the filling operation.

21. The water level detection system of claim 1, wherein the controller is further electronically coupled to and communicates with at least one additional pool, spa, fountain or water feature treatment system.

22. The water level detection system of claim 21, wherein the at least one treatment system is at least one of an at least one purification system, pH balancing system, softener system, chlorination system, heating system, filtration system, pumping system, wherein the controller communicates data from the water level detection system to at least one the treatment system.

23. The water level detection system of claim 22, wherein the data communicated to or from the water level detection system includes data regarding at least one of temperature of the water, salinity of the water, pH of the water, rate of evaporation of the water, rate of loss of the water, rate of fill of the water, pressure in the water level detection system, humidity, detecting pump speeds, pump status, amount of water added, dilution rates, salinity, and abnormal fill conditions.

24. The water level detection system of claim 23, wherein the data from the water level detection system is stored as historical data.

25. The water level detection system of claim 24, wherein the controller utilizes the historical data for comparison to a real time measurements to detect errors and maintain the water level detection system operation within a set of safety limits.

26. The water level detection system of claim 25, wherein the controller sends an alert to a graphical user interface for display on the interface if the real time measurement is outside the pre-determined safety limits of the historical data.

27. The water level detection system of claim 1, wherein the controller of the water detection system further comprises a control routine using the at least one sensor to detect the height or pressure change of the pump operation or having the operation signaled to the controller and measuring the height of the column of water and allowing it to decrease or increase to flush the water in the tap line.

28. The water level detection system of claim 1, wherein the controller of the water detection system further comprises a control routine to detect entrapped air in the plumbing line or tap line.

29. The water level detection system of claim 28, wherein the control routine to detect entrapped air further triggers a safety shutoff in the pump directly or via a control panel.

30. The water level detection system of claim 1, wherein the controller of the water detection system further comprises an operations check routine.

31. The water level detection system of claim 30, wherein the operations check routine further comprises receiving information from an at least one height sensor detecting the height of a water column in the water tap and receiving information from an at least one pressure sensor sensing pressure in the air column above the water column, verifying the data from said at least one height sensor when the controller has received data indicating the pump is running and reporting if the information received from the at least one height sensor and the at least one pressure sensor agree with one another and the status of the pump.

32. The water level detection system of claim 31, wherein the reporting further comprises activating at least one indicator element on a user interface.

33. The water level detection system of claim 1, wherein the user interface further comprises an override switch, the override switch being engaged and disabling an at least one controlled valve controlling a supply or removal or both supply and removal of water in the pool, spa, fountain or water feature.

34. The water level detection system of claim 33, wherein the override switch is engaged as part of a fault identification routine to detect at least one of shorts or open circuits in the water detection system, faulty sensors, and vent systems.

35. The water level detection system of claim 1, wherein the controller detects the amount of water filling the pool and further calculates values for at least one of an amount of salt dilution due to an added amount of water, an amount of chlorine to be added due to added water, and an amount of pH balancer to be added due to the addition of water and displays same to a user or communicates same to a controller of a further system in the pool filtration system.

36. The water level detection system of claim 1, wherein the controller is located remotely from the sensing module.

37. The water level detection system of claim 1, wherein the controller is located in a housing with the sensing module.

38. The water level detection system of claim 1, further comprising a negative edge in said body of water pouring water to a filtration trough, whereby the filtration trough has a trough level sensing sub-system coupled to the water level detection system and the trough level sensing sub-system ensures water flows from the body of water to the trough.

39. The water level detection system of claim 1, further comprising an electric coupling having at least two active power inputs coupled to an at least two switched relays coupled to at least two drivers and controlled by a microcontroller, the electric coupling switching the power input through instructions from the micro controller switching in or out the at least two power inputs.

40. The water level detection system of claim 14, wherein the controller is further adapted to provide a dynamic adjustment of the target point or fill point using an adjustment increment to adjust the set point to an incremented target point or fill point for the fill cycle.

41. The water level detection system of claim 13, wherein the controller communicates with the controlled valve to control removal of water from the water supply line in a negative fill operation.

42. The water level detection system of claim 41, wherein the controller senses through a sensor a pressure differential in the tap pipe to determine whether the negative fill operation has reached an absolute level.

43. The water level detection system of claim 41, wherein the controller is further adapted to provide a pressure offset of a target pressure during the negative fill operation to account for instantaneous pressure spikes that appear during the negative fill operation.

44. The water level detection system of claim 41, wherein the controller utilizes direct measurement of the height of a column of water in the tap line to determine whether the negative fill operation has reached an absolute level for a target point.

45. The water level detection system of claim 41, wherein the controller is further adapted to provide a dynamic adjustment of the target point using an adjustment increment to adjust the target point to an incremented target point for the negative fill cycle.

* * * * *